(12) United States Patent
Araujo et al.

(10) Patent No.: US 11,638,191 B2
(45) Date of Patent: Apr. 25, 2023

(54) INTRA-RAT HANDOVERS WITH CORE NETWORK CHANGE

(71) Applicant: Telefonaktiebolaget LM Ericsson (publ), Stockholm (SE)

(72) Inventors: Lian Araujo, Solna (SE); Patrik Rugeland, Stockholm (SE); Oumer Teyeb, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/687,513

(22) Filed: Mar. 4, 2022

(65) Prior Publication Data
US 2022/0191759 A1 Jun. 16, 2022

Related U.S. Application Data

(63) Continuation of application No. 16/326,887, filed as application No. PCT/EP2019/051327 on Jan. 21, 2019, now Pat. No. 11,272,415.
(Continued)

(51) Int. Cl.
*H04W 36/14* (2009.01)
*H04W 36/08* (2009.01)
*H04W 36/12* (2009.01)

(52) U.S. Cl.
CPC ........... *H04W 36/14* (2013.01); *H04W 36/08* (2013.01); *H04W 36/12* (2013.01)

(58) Field of Classification Search
CPC . H04W 36/14; H04W 88/06; H04W 36/0022; H04W 36/0061; H04W 36/0016;
(Continued)

(56) References Cited

U.S. PATENT DOCUMENTS 9,503,944 B2 11/2016 Centonza et al.
9,967,817 B2 5/2018 Yang et al.
(Continued)

FOREIGN PATENT DOCUMENTS

CN 104170469 A 11/2014
CN 105992293 A 10/2016
(Continued)

OTHER PUBLICATIONS

3rd Generation Partnership Project; Technical Specification Group Radio Access Network; NG-RAN; NG Application Protocol (NGAP), (Release 15), 3GPP TS 38.413 V0.7.0 (Mar. 2018).
(Continued)

*Primary Examiner* — Allahyar Kasraian
(74) *Attorney, Agent, or Firm* — Coats & Bennett, PLLC

(57) ABSTRACT

Methods and apparatus are provided for handover of a UE from a source node connected to a first core network to a target node connected to a second core network. The UE receives, from the source node, a mobility command including an indication of the radio access technology (RAT) used by the target node and a message container containing configuration information for the target node. The UE further determines, based on the indication of the RAT used by the target node, whether to treat the handover as an inter-RAT handover or as an intra-RAT handover with a core network change, and performs a radio resource control procedure for one of an inter-RAT handover or an intra-RAT handover with a core network change based on the determination.

16 Claims, 23 Drawing Sheets

Related U.S. Application Data

(60) Provisional application No. 62/653,526, filed on Apr. 5, 2018.

(58) Field of Classification Search
CPC .. H04W 36/08; H04W 36/12; H04W 36/0066
See application file for complete search history.

(56) References Cited

U.S. PATENT DOCUMENTS

| | | | |
|---|---|---|---|
| 2010/0330982 A1* | 12/2010 | Ishii | H04W 76/18 455/422.1 |
| 2015/0087354 A1 | 3/2015 | Ianev et al. | |
| 2015/0092552 A1* | 4/2015 | Bajj | H04W 24/02 370/254 |
| 2015/0146694 A1* | 5/2015 | Gopal | H04W 36/00835 370/332 |
| 2016/0302128 A1 | 10/2016 | Anchan et al. | |
| 2018/0192337 A1 | 7/2018 | Ryu et al. | |
| 2019/0159088 A1 | 5/2019 | Shi et al. | |
| 2019/0174571 A1 | 6/2019 | Deenoo et al. | |
| 2020/0092718 A1 | 3/2020 | Ohlsson et al. | |
| 2020/0305211 A1 | 9/2020 | Foti et al. | |

FOREIGN PATENT DOCUMENTS

| | | | | |
|---|---|---|---|---|
| CN | 107852651 A | 3/2018 | | |
| EP | 3688949 B1 * | 6/2022 | ........... | H04L 63/061 |
| WO | 2016060897 A1 | 4/2016 | | |
| WO | 2017172263 A1 | 10/2017 | | |
| WO | 2017172265 A1 | 10/2017 | | |

OTHER PUBLICATIONS

Qualcomm Incorporated, Multi-RAT node IDs in NG-RAN, 3GPP TSG-RAN WG3 Meeting #97, Berlin, Germany, Aug. 21-25, 2017, R3-172731.

ZTE, Discussion on inter-RAT mobility, 3GPP TSG-RAN WG3#97, Berlin, Germany, Aug. 21-25, 2017, R3-172694.

Samsung, Support of inter-system inter-RAT handover between NR and E-UTRA, 3GPP TSG-RAN WG3 Meeting #97, Berlin, Germany, Aug. 21-25, 2017, R3-172970.

Samsung, Data forwarding for inter-system inter-RAT handover from 5GS to EPS, 3GPP TSG-RAN WG3 Meeting #97, Berlin, Germany, Aug. 21-25, 2017, R3-172974.

Liu, Liang, et al., Analysis of handover performance improvement in cloud-RAN architecture, 7th International Conference on Communications and Networking in China, IEEE, 2012, p. 850-855.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 15)", Technical Specification, 3GPP TS 36.331 V15.0.1, Jan. 1, 2018, pp. 1-776, 3GPP.

Ericsson, Inter-system and inter-RAT mobility between NR and LTE, 3GPP TSG-RAN WG2 #98-AH, Qingdao, P.R. of China, Jun. 27-29, 2017, Tdoc R2-1707230 (Revision of R2-1704178).

LG Electronics Inc., LTE Handover with CN Type Change for E-UTRA connected to 5GC, 3GPP TSG-RAN WG2 Meeting #99, Berlin, Germany, Aug. 21-25, 2017, R2-1708942.

Ericsson, NR parts of inter-system inter-RAT mobility between NR and E-UTRA, 3GPP TSG-RAN WG3 Meeting #96, Hangzou, P.R. China, May 15-19, 2017, R3-171826.

Ericsson, RRC procedures for inter-RAT mobility from NR to E-UTRA, 3GPP TSG-RAN WG2 #101, Athens, Greece, Feb. 26-Mar. 2, 2018, R2-1802643.

Ericsson, Principles of E-UTRA Handover involving CN change, 3GPP TSG-RAN WG2 #102, Busan, Republic of Korea, May 21-25, 2018, R2-1806845 (Revision of R2-1804855).

3GPP TSG-RAN WG2 Meeting #AH1807, Montreal, Canada, Jul. 2-6, 2018, R2-1810923.

Samsung, Solution for key issue 18: Interworking between the NextGen Core and EPC, SA WG2 Meeting #116, Jul. 11-15, 2016, Vienna, Austria, S2-163620.

Ericsson, "Inter-system and inter-RAT mobility between NR and LTE", 3GPP TSG-RAN WG2 #98-AH, Qingdao, P.R. of China, Jun. 27-29, 2017, pp. 1-6, Tdoc R2-1707230 (Revision of R2-1704178).

Ericsson, "CR to 36.331 for intra-LTE inter-system mobility", 3GPP TSG-RAN WG2 Meeting #AH1807, Montreal, Canada, Jul. 2-6, 2018, pp. 1-25, R2-1810923.

Ericsson, "Principles of E-UTRA Handover involving CN change", 3GPP TSG-RAN WG2 #102, Busan, Republic of Korea, May 21-25, 2018, pp. 1-2, R2-1806845 (Revision of R2-1804855).

LG Electronics Inc. "LTE Handover with CN Type Change for E-UTRA connected to 5GC", 3GPP TSG-RAN WG2 Meeting #99, Berlin, Germany, Aug. 21-25, 2017, pp. 1-2, R2-1708942.

* cited by examiner

INTRA-RAT HANDOVERS WITH CORE NETWORK CHANGE

RELATED APPLICATIONS

The present application is a continuation of U.S. patent application Ser. No. 16/326,887, which was filed on Feb. 20, 2019, which is a national stage application of PCT/EP2019/051327, which was filed on Jan. 21, 2019, and claims benefit of U.S. Provisional Application 62/653,526, which was filed Apr. 5, 2018, the disclosures of each of which are incorporated herein by reference in their entirety.

TECHNICAL FIELD

The present disclosure relates generally to handover procedures for wireless communication networks and, more particularly to handover procedures for handovers between base stations connected to different core networks.

BACKGROUND

Evolved Universal Terrestrial Radio Access (E-UTRA) is the air interface used in the Third Generation Partnership Project (3GPP) standard known as Long Term Evolution (LTE). The base stations in LTE networks are generally known as Evolved NodeBs (eNBs). Intra-Radio Access Technology (RAT) handover in LTE between eNBs without Core Network (CN) change is performed with a RRCConnectionReconfiguration message including the mobilityControlInfo Information Element (IE), generated by the target Evolved NodeB (eNB) and delivered to the user equipment (UE) by the source eNB. For a successful reconfiguration, the UE responds with a RRCConnectionReconfiguration-Complete message.

Inter-RAT handover from LTE basically implies to a full configuration of the UE, where none of LTE-established protocol sublayers and previously used security keys are kept. A tunneling procedure is adopted, where the source eNB sends a MobilityFromEUTRACommand message to the UE containing an embedded message pertinent to the target RAT. The MobilityFromEUTRACommand message contains a targetRAT-MessageContainer and TargetRAT-type indication. The former contains the configuration message itself from the target RAT and the latter defines the RAT, e.g., UTRA, GERAN. The nas-SecurityParam-FromEUTRA is used for security key derivation in UTRAN.

Similarly, inter-RAT handover to LTE is performed in a tunneling scheme with the RRCConnectionReconfiguration message delivered to the UE via the source RAT. This Radio Resource Control (RRC) message indicates a full configuration and does not retain any protocol sublayers established by the source RAT and previously derived security keys.

When moving from E-UTRA, specific actions are taken for successful and failure handover case, as specified in sections 5.4.3.4 and 5.4.3.5 respectively, from 3GPP TS 36.331 (v15.0.1 [2018-01]). For the successful handover cases, the procedure triggers the release of all E-UTRA configurations established. When moving to E-UTRA, specific actions are taken for failure handover case, as specified in section 5.4.2.5, from 3GPP TS 36.331 (v15.0.1 [2018-01]).

There currently exist certain challenges for supporting intra-RAT handover with a core network change. In legacy inter-RAT handover in E-UTRA, when making a successful handover from E-UTRA, all the configurations are released from E-UTRA since the UE would be connected to a different target RAT. However, since the same procedures would be used for handover case of intra-LTE with CN change, the release of E-UTRA configuration after completing the MobilityFromEUTRACommand procedure will force the UE transitions to IDLE mode returning to CONNECTED mode in the new node that is attached to a different CN.

The same rationale is applied for failure cases in current procedures for inter-RAT handover in E-UTRA. That is, when mobility from E-UTRA or handover to E-UTRA fails, a connection re-establishment procedure is performed and thus the UE transitions to IDLE mode before returning to CONNECTED mode with the node (or another node) that is attached to the original CN. Also, multiple failure procedures could be initiated because there are failure procedures for handover from and to E-UTRA, as well as failure during reception of RRCConnectionReconfiguration message, with different actions taken in each case.

SUMMARY

Certain aspects of the present disclosure and their embodiments may provide solutions to these or other challenges. For intra-RAT handover with CN change, the source node and target node implement signaling procedures similar to the case where inter-RAT handover is performed, but the procedures invoked for success or failure of the handover are similar to the case for an intra-RAT handover. Enhancements to the RRC inter-RAT mobility procedures are made whereby the legacy behavior of leaving the original RAT (upon the successful completion) or the re-establishment (in case of failure) are prevented.

According to one aspect of the disclosure, methods and apparatus are provided to handle failure while trying to perform E-UTRA inter-RAT handover after receiving a handover command with RRC (connection) reconfiguration message, to include actions specific for the case of E-UTRA intra-RAT handover with CN change. Since the case combines three different procedures; Mobility from E-UTRA, handover to E-UTRA and RRCConnectionReconfiguration, which all trigger a failure upon the expiration of the timer T304. This problem is avoided by the methods and apparatus herein described.

According to one aspect of the disclosure, methods and apparatus are provided to handle successful handover in E-UTRA inter-RAT case, after receiving a handover command with RRC (connection) reconfiguration message, to include actions specific for the case of E-UTRA intra-RAT handover with CN change. Since a successful handover MobilityFromEUTRACommand procedure would result in the UE releasing all radio resources, which problem is avoided by the methods and apparatus herein described.

An advantage of the solution is that intra-RAT handover with CN change can be performed with proper functioning of successful and failure cases, which will prevent ambiguity in the performed actions in Radio Resource Control (RRC). Without the changes proposed in this disclosure, a UE will be forced to go via the IDLE mode when performing an intra-LTE inter-system handover, which could cause a major service disruption (e.g., if the UE already has active delay sensitive services/bearers).

Some embodiments of the disclosure comprise methods implemented by a UE in a wireless communication network of performing a handover from a source node connected to a first core network to a target node connected to a second core network. The UE receives, from the source node, a mobility command including an indication of the radio access technology (RAT) used by the target node and a message container containing configuration information for the target node. The UE further determines, based on the indication of the RAT used by the target node, whether to treat the handover as an inter-RAT handover or as an intra-RAT handover with a core network change, and performs a radio resource control procedure for one of an inter-RAT handover or an intra-RAT handover with a core network change based on the determination.

Other embodiments of the disclosure comprise a UE configured to perform the above described method. In one embodiment, the UE comprises a communication circuit configured for communication with one or more nodes in the wireless communication network and a processing circuit. The processing circuit is configured to receive, from a source node, a mobility command including an indication of the radio access technology (RAT) used by a target node, and a message container containing configuration information for the target node. The processing circuit is further configured to determine, based on the indication of the RAT used by the target node, whether to treat the handover as an inter-RAT handover or as an intra-RAT handover with a core network change, and to perform a radio resource control procedure for one of an inter-RAT handover or an intra-RAT handover with a core network change based on the determination.

Another aspect of the disclosure comprises computer programs for configuring a UE to perform the above described methods. The computer program comprises instructions that, when executed on at least one processor of a UE cause the UE to perform the method described above. A computer program in this regard may comprise one or more code modules corresponding to the means or units described above.

Embodiments further include a carrier containing such a computer program. This carrier may comprise one of an electronic signal, optical signal, radio signal, or non-transitory computer readable storage medium.

Other embodiments of the disclosure comprise methods performed by a base station. The base station sends, to a UE, a mobility command including a radio access technology (RAT) type indication and a message container containing configuration information for the target node. The base station sets the RAT type indication in the mobility command to a predetermined value to indicate to the user equipment that the handover involves a core network change.

Other embodiments of the disclosure comprise a base station configured to perform the above described method. In one embodiment, the base station comprises a communication circuit configured for communication with the UE and a processing circuit. The processing circuit is configured to send, to the UE, a mobility command including a radio access technology (RAT) type indication and a message container containing configuration information for the target node. The processing circuit is further configured to set the RAT type indication in the mobility command to a predetermined value to indicate to the user equipment that the handover involves a core network change.

Another aspect of the disclosure comprises a computer program for configuring a base station to perform the above described methods. The computer program comprises instructions that, when executed on at least one processor of a base station cause the base station to perform the method described above. A computer program in this regard may comprise one or more code modules corresponding to the means or units described above.

Embodiments further include a carrier containing such a computer program. This carrier may comprise one of an electronic signal, optical signal, radio signal, or non-transitory computer readable storage medium.

DETAILED DESCRIPTION

The present disclosure relates to procedures supporting intra-RAT handovers with a change in core network (e.g., from an EPC to a 5GC or vice versa). Exemplary embodiments of the disclosure are described in the context of a handover between two base stations connected respectively to an EPC network and to a 5GC network. A 5GC network is a next generation core network according to the 3GPP 5G standard which is currently under development.

Figure 1:
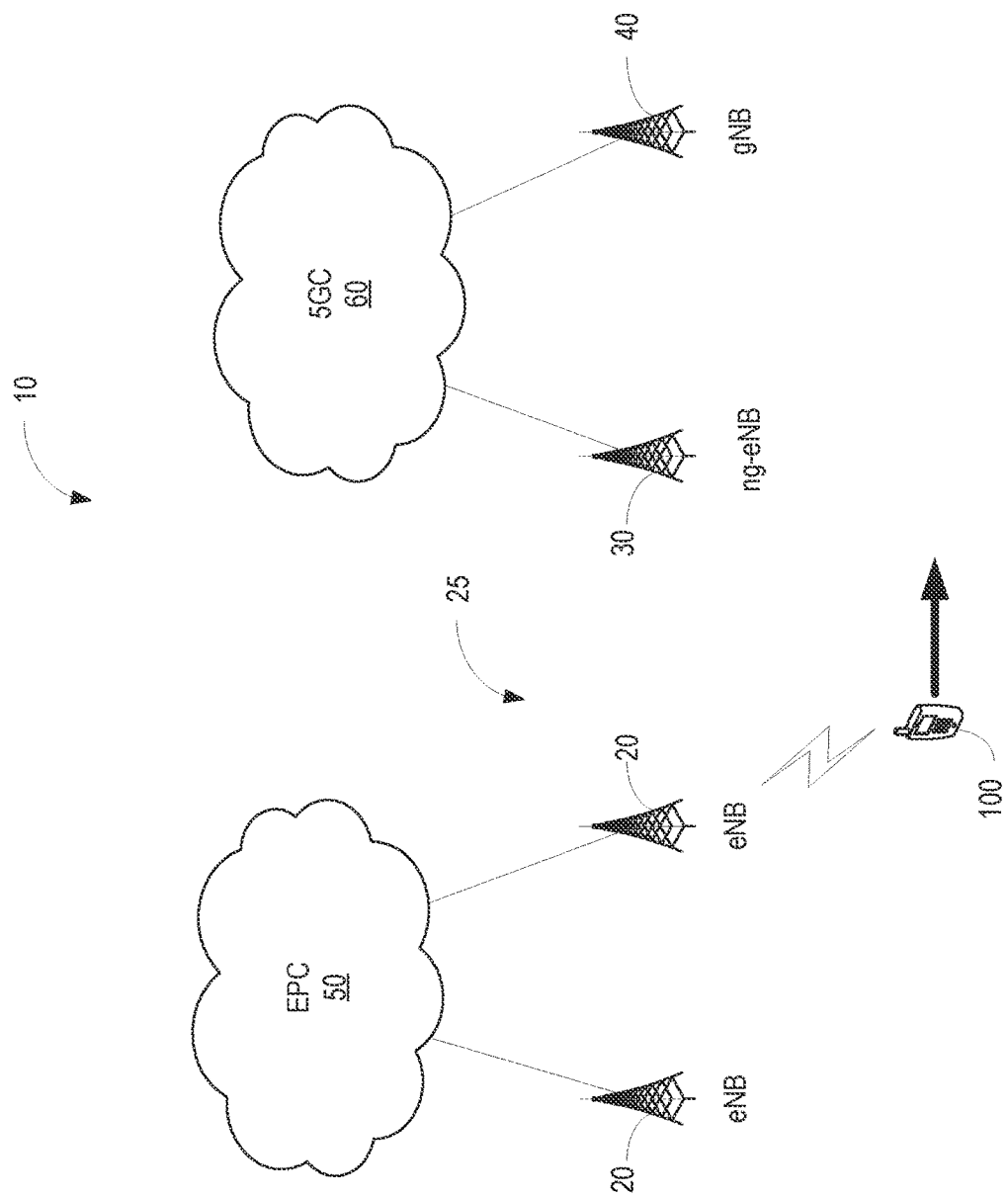
FIG. 1 illustrates a successful RRC connection reconfiguration following an intra-LTE handover.

FIG. 1 illustrates a wireless communication network 10 comprising a plurality of base stations 20, 30 and 40, some of which connect to an EPC network 50 and some of which connect to a 5GC network 60. In the exemplary embodiments disclosed, the base stations 20 connected to the EPC network 50 comprise conventional eNBs implementing the LTE air interface specification, also known as E-UTRA. The base stations 30 connecting to the 5GC network 60 comprise Next Generation eNBs (ng-eNBs) implementing the E-UTRA air interface. The base stations 40 connecting to the 5GC network 60 comprise 5G NodeBs (gNBs) implementing the New Radio (NR) air interface specification. The eNBs 20 and ng-eNBs 30 are referred to herein generically as E-UTRA base stations and are part of an Evolved Universal Mobile Telecommunications System (UMTS) Terrestrial Radio Access Network (EUTRAN) 25. Some networks 10 may also include base stations that connect to both the EPC network 50 and the 5GC network 60.

A UE 100 is shown in FIG. 1. The UE 100 is connected to one of the eNBs 20 connected to the EPC network 50, but is being handed over to a ng-eNB 30 connected to the 5GC network 60, either because it is moving towards the 5GC network 60 or because of a change in radio conditions. In of the UE 100, where none of LTE-established protocol sublayers and previously used security keys are kept. A tunneling procedure is adopted, where the source base station 20 (e.g., eNB) sends a MobilityFromEUTRACommand message to the UE 100 containing an embedded message pertinent to the target RAT. The MobilityFromEUTRACommand message is defined in the 3GPP standard TS 36.331 (v15.0.1 [2018-01]) and is shown below. The targetRAT-MessageContainer and TargetRAT-type and the main contents in MobilityFromEUTRACommand message related to UE configuration in the target RAT. The former contains the configuration message itself from the target RAT and the latter defines the RAT, e.g., UTRA, GERAN. The currently defined target RAT types include utra (Universal Terrestrial Radio Access), geran (GSM EDGE Radio Access Network (RAN)), cdma2000-1XRTT (cdma2000 Single-Carrier (1x) Radio Transmission Technology (RTT)), and cdma2000-HRPD (cdma2000 High Rate Packet Data (HRPD)). The nas-SecurityParamFromEUTRA is used for security key derivation in UTRAN.

MobilityFromEUTRACommand Message

```
-- ASN1START
                                    -------------
                                    Omitted Parts
Handover ::=               SEQUENCE {
    targetRAT-Type              ENUMERATED {
                                    utra, geran, cdma2000-1XRTT, cdma2000-HRPD,
                                    spare4, spare3, spare2, spare1, ...},
    targetRAT-MessageContainer  OCTET STRING,
    nas-SecurityParamFromEUTRA  OCTET STRING (SIZE (1))    OPTIONAL,   -- Cond UTRAGERAN
    systemInformation           SI-OrPSI-GERAN             OPTIONAL    -- Cond PSHO
}
                                    -------------
                                    Omitted Parts
                                    -------------
-- ASN1STOP
``` this scenario, a handover needs to be performed to handover the UE 100 from the eNB 20 connected to the EPC network 50 to the ng-eNB 30 connected to the 5GC network 60. In this scenario, the eNB 20 and ng-eNB 30 use the same RAT (in this case LTE) on the air interface but connect to different types of core networks. A similar scenario would arise for a UE 100 moving from ng-eNB 30 connected to the 5GC network 60 to a eNB 20 connected to the EPC network 50. The procedures herein described provided solutions for intra-RAT handovers with a core network change.

Figure 2:
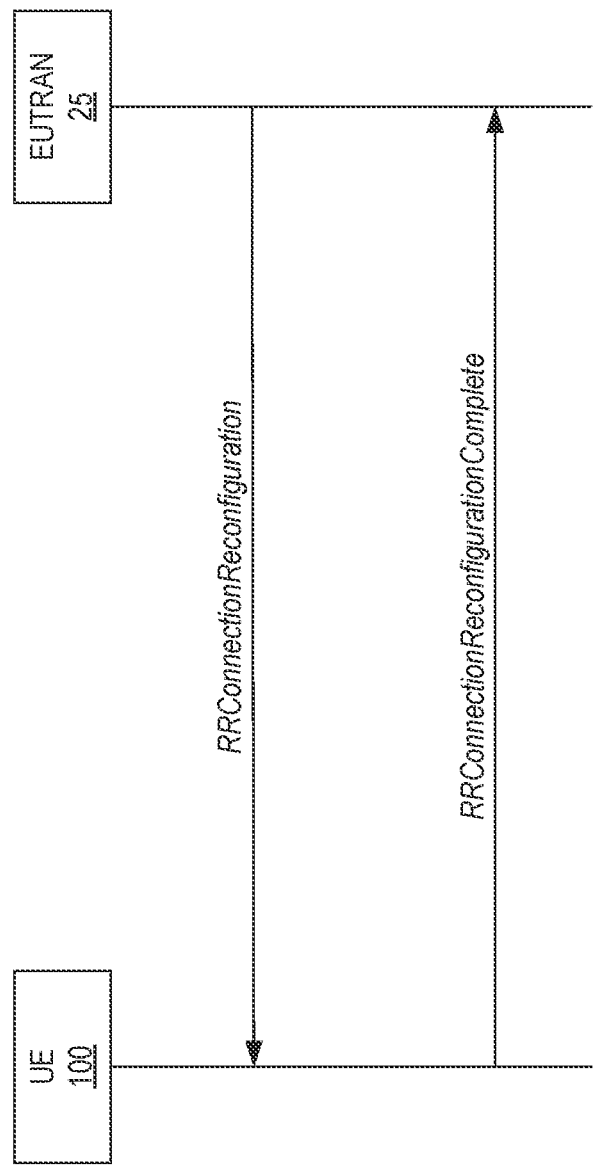
FIG. 2 illustrates a successful inter-RAT handover for a UE moving from LTE to another RAT.

The current LTE standards include procedures for intra-RAT handover without a CN change and inter-RAT handovers. FIG. 2 illustrates an exemplary intra-RAT handover procedure. Intra-RAT handover in LTE without a CN change is performed with a RRCConnectionReconfiguration message including the mobilityControlInfo Information Element (IE), generated by the target base station 20 (e.g., eNB) and delivered to the UE 100 by the source base station 20. The RRCConnectionReconfiguration message is defined in the 3GPP standard TS 36.331 (v15.0.1 [2018-01]) and enables delta configuration of the UE 100 in intra-LTE handover, where part of current UE configuration is kept for the connection with the target base station 20, including security parameters. For a successful reconfiguration, the UE 100 responds with a RRCConnectionReconfigurationComplete message.

Figure 3:
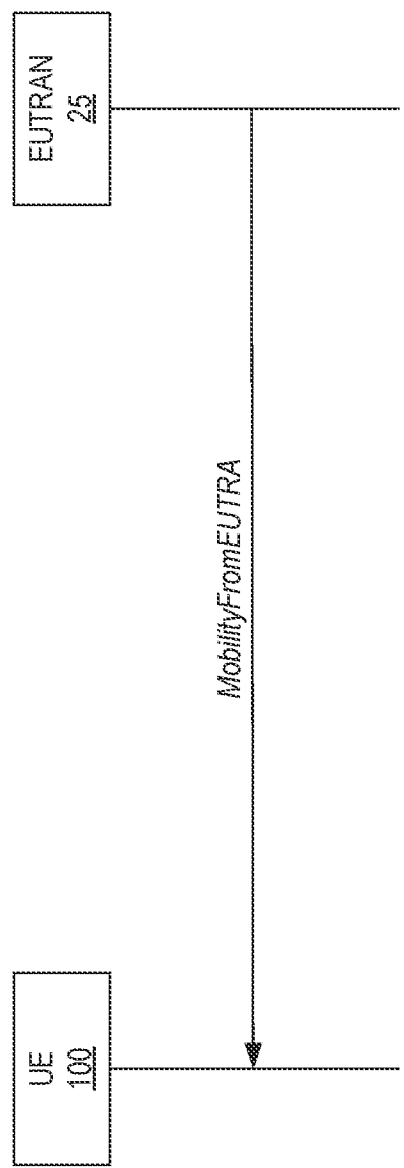
FIG. 3 illustrates a successful inter-RAT handover for a UE moving to LTE from another RAT.

FIG. 3 illustrates an inter-RAT handover from LTE. Inter-RAT handover from LTE implies to a full configuration When moving from E-UTRA, specific actions are taken for successful and failure handover cases, as specified in sections 5.4.3.4 and 5.4.3.5 respectively, from 3GPP TS 36.331 (v15.0.1 [2018-01]), which are reproduced in small caps below. Note that for the successful handover case, the procedure described below triggers the release of all E-UTRA configurations established.

5.4.3.4 Successful Completion of the Mobility from E-UTRA

UPON SUCCESSFULLY COMPLETING THE HANDOVER, THE CELL CHANGE ORDER OR ENHANCED 1XRTT CS FALLBACK, THE UE SHALL:
1> PERFORM THE ACTIONS UPON LEAVING RRC_CONNECTED AS SPECIFIED IN 5.3.12, WITH RELEASE CAUSE 'OTHER';
NOTE: IF THE UE PERFORMS ENHANCED 1XRTT CS FALLBACK ALONG WITH CONCURRENT MOBILITY TO CDMA2000 HRPD AND THE CONNECTION TO EITHER CDMA2000 1XRTT OR CDMA2000 HRPD SUCCEEDS, THEN THE MOBILITY FROM E-UTRA IS CONSIDERED SUCCESSFUL.

5.4.3.5 Mobility from E-UTRA Failure
THE UE SHALL:
1> IF T304 EXPIRES (MOBILITY FROM E-UTRA FAILURE); OR 1> IF THE UE DOES NOT SUCCEED IN ESTABLISHING THE CONNECTION TO THE TARGET RADIO ACCESS TECHNOLOGY; OR
1> IF THE UE IS UNABLE TO COMPLY WITH (PART OF) THE CONFIGURATION INCLUDED IN THE MOBILITYFROMEUTRACOMMAND MESSAGE; OR
1> IF THERE IS A PROTOCOL ERROR IN THE INTER RAT INFORMATION INCLUDED IN THE MOBILITYFROMEUTRACOMMAND MESSAGE, CAUSING THE UE TO FAIL THE PROCEDURE ACCORDING TO THE SPECIFICATIONS APPLICABLE FOR THE TARGET RAT:
2> STOP T304, IF RUNNING;
2> IF THE CS-FALLBACKINDICATOR IN THE MOBILITYFROMEUTRACOMMAND MESSAGE WAS SET TO TRUE OR E-CSFB WAS PRESENT:
3> INDICATE TO UPPER LAYERS THAT THE CS FALLBACK PROCEDURE HAS FAILED;
2> REVERT BACK TO THE CONFIGURATION USED IN THE SOURCE PCELL, EXCLUDING THE CONFIGURATION CONFIGURED BY THE PHYSICALCONFIGDEDICATED, MAC-MAINCONFIG AND SPS-CONFIG;
2> INITIATE THE CONNECTION RE-ESTABLISHMENT PROCEDURE AS SPECIFIED IN 5.3.7.

Figure 4:
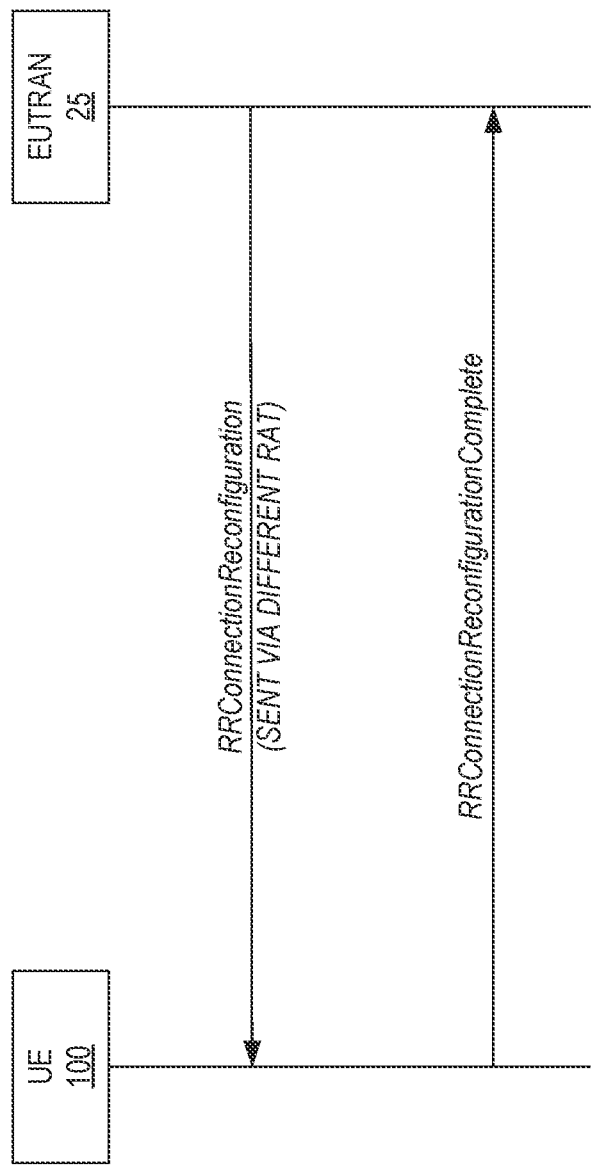
FIG. 4 illustrates an exemplary wireless communication network including an Evolved Packet Core (EPC) network and a Fifth Generation (5G) Core (5GC) network.

FIG. 4 illustrates an inter-RAT handover to LTE. Similar to the inter-RAT handover from LTE, handover is performed using a tunneling scheme with the RRCConnectionReconfiguration message delivered to the UE 100 via the source RAT as shown in FIG. 4. This RRC message indicates a full configuration and does not retain any protocol sublayers established by the source RAT and previously derived security keys. When moving to E-UTRA, specific actions are taken for failure handover case, as specified in section 5.4.2.5, from 3GPP TS 36.331 (v15.0.1 [2018-01]), which is reproduced in small caps below.

5.4.2.5 T304 Expiry (Handover to E-UTRA Failure)
THE UE SHALL:
1> UPON T304 EXPIRY (HANDOVER TO E-UTRA AILURE):
2> RESET MAC;
2> PERFORM THE ACTIONS DEFINED FOR THIS FAILURE CASE AS DEFINED IN THE SPECIFICATIONS APPLICABLE FOR THE OTHER RAT;

When the intra-RAT handover procedures were developed, a change in the type of the core network was not contemplated so these procedures would likely fail in the scenarios under consideration. The procedures for inter-RAT in LTE could be adapted to facilitate an intra-RAT handover with a CN change, since security parameters and bearer handling are different for each CN, while the Packet Data Convergence Protocol (PDCP) configuration might also be changed. However, the inter-RAT handover procedures currently defined in LTE would require the UE 100 to enter an IDLE mode and then re-establish a connection with the target node (e.g., eNB or ng-eNB).

In exemplary embodiments of the present disclosure, the MobilityFromEUTRACommand message defined in LTE for inter-RAT handovers is reused for intra-RAT handovers with a core network change. When a UE 100 is instructed to perform an intra-LTE handover from a source base station 20 connected to EPC to a target base station 30 connected to 5GC, or vice versa, the target node prepares a RRCConnectionReconfiguration message which it sends to the source node (e.g., eNB 20 or ng-eNB 30) via the X2, Xn, S1 or NG interfaces. The source node then embeds the RRCConnectionReconfiguration message inside a container called MobilityFromEUTRACommand setting the parameter targetRAT-Type to eutra to indicate that the handover involves a change of the core network. The modified MobilityFromEUTRACommand message is shown below.

```
-- ASN1START
MobilityFromEUTRACommand ::=            SEQUENCE {
    rrc-TransactionIdentifier               RRC-TransactionIdentifier,
    criticalExtensions                      CHOICE {
        c1                                      CHOICE{
            MobilityFromEUTRACommand-r8             MobilityFromEUTRACommand-r8-IEs,
            MobilityFromEUTRACommand-r9                 MobilityFromEUTRACommand-r9-IEs,
            spare2 NULL, spare1         NULL
        },
        criticalExtensionsFuture                SEQUENCE { }
    }
}
MobilityFromEUTRACommand-r8-IEs ::=     SEQUENCE {
    cs-FallbackIndicator                    BOOLEAN,
    purpose                                 CHOICE{
        handover                                Handover,
        cellChangeOrder                         CellChangeOrder
    },
    nonCriticalExtension                    MobilityFromEUTRACommand-v8a0-IEs   OPTIONAL
}
------------------------
Omitted irrelevant parts
------------------------
Handover ::=                            SEQUENCE {
    targetRAT-Type                          ENUMERATED {
                                                utra, geran, cdma2000-1XRTT, cdma2000-HRPD,
                                                eutra, spare3, spare2, spare1, ...},
    targetRAT-MessageContainer              OCTET STRING,
    nas-SecurityParamFromEUTRA              OCTET STRING (SIZE (1))   OPTIONAL,   -- Cond UTRAGERAN
    systemInformation                       SI-OrPSI-GERAN            OPTIONAL    -- Cond PSHO
}
```

```
------------------------
Omitted irrelevant parts
------------------------
-- ASN1STOP
```

As the UE 100 receives the MobilityFromEUTRACommand, the UE 100 will decode the targetRAT-MessageContainer as a RRCConnectionReconfiguration as the targetRAT-Type is set to eutra and the UE 100 will perform the procedures as specified in 36.331 (v15.0.1 [2018-01]) clause 5.4.2.3 'Reception of the RRCConnectionReconfiguration by the UE. If the procedure is successful, the UE 100 enters RRC_CONNECTED and the procedure ends.

For inter-RAT handover in LTE, different procedures are currently defined for successful handover depending on whether the UE 100 is moving from E-UTRA and to E-UTRA. For intra-LTE with CN change case, both procedures should be performed since the UE is going from E-UTRA to E-UTRA.

Successful Intra-RAT Handover with CN Change

Because this RRCConnectionReconfiguration was triggered by a reception of the MobilityFromEUTRACommand, the successful completion of the RRCConnectionReconfiguration will result in a successful completion of the mobility from E-UTRA (as specified in 36.331 v15.0.1 [2018-01] clause 5.4.3.4). Currently, this clause indicates that the UE 100 should leave RRC_CONNECTED and release all radio resources and the RRC connection. Since the UE 100 has setup radio E-UTRA radio resources in the target RAT, this would imply that the UE 100 would lose this connection. To properly handle the successful handover in intra-RAT with targetRAT-Type is set to eutra in the MobilityFromEUTRACommand message, the RRC procedures specified in section 5.4.3.4 from TR 36.331 (v15.0.1 [2018-01]), are only executed if the targetRAT-Type is not set to eutra in the MobilityFromEUTRACommand message. Alternatively, the specification lists all the options the targetRAT-Type can be set to accept eutra (i.e., utra, geran, cdma2000-1xRTT, cdma2000-HRPD, or any new value introduced in the spare values or after the extension, e.g., nr).

An example of the modified specification for successful handover is shown in small caps below, with the changes highlighted:

5.4.3.4 Successful Completion of the Mobility from E-UTRA

UPON SUCCESSFULLY COMPLETING THE HANDOVER, THE CELL CHANGE ORDER OR ENHANCED 1XRTT [CIRCUIT-SWITCHED] CS FALLBACK [CSFB], THE UE SHALL:
1> IF THE TARGETRAT-TYPE IN THE RECEIVED MOBILITYFROMEUTRACOMMAND IS SET TO EUTRA:
    2> THE PROCEDURE ENDS;
1> ELSE:
    2> PERFORM THE ACTIONS UPON LEAVING RRC_CONNECTED AS SPECIFIED IN 5.3.12, WITH RELEASE CAUSE 'OTHER';
NOTE: IF THE UE PERFORMS ENHANCED 1XRTT CS FALLBACK ALONG WITH CONCURRENT MOBILITY TO CDMA2000 HRPD AND THE CONNECTION TO EITHER CDMA2000 1xRTT OR CDMA2000 HRPD SUCCEEDS, THEN THE MOBILITY FROM E-UTRA IS CONSIDERED SUCCESSFUL.

Intra-RAT Handover with CN Change Failure

When performing the procedures for RRCConnectionReconfiguration message, the timer T304 is started. If the expiry of timer T304 happens, both failure procedures from handover to E-UTRA and mobility from E-UTRA are triggered, which are specified in clauses 5.4.2.5 and 5.4.3.5 respectively, in 36.331 (v15.0.1 [2018-01]). However, it is only needed to trigger the failure procedure once, and none of the procedures consider storing the handover failure information.

To properly handle the failure of inter-RAT handover with targetRAT-Type set to eutra in the MobilityFromEUTRACommand message, the UE 100 should perform only one RRC procedure chain in case of failure (T304 expiry), i.e., do not perform the failure process of E-UTRA inter-RAT handover with CN change in multiple sections in TR 36.331 (v15.0.1 [2018-01]). The RRC procedures should be specified as in (or refer to) section 5.3.5.6 from TR 36.331 (v15.0.1 [2018-01]), which correspond to failure handling for E-UTRA intra-RAT handover case.

Three examples of the modified LTE specification are shown below, with the changes to support intra-RAT handover.

Example 1 for Intra-LTE Handover with CN Change Failure 5.4.3.5 Mobility from E-UTRA Failure The UE shall:
1> IF THE TARGETRAT-TYPE IN THE RECEIVED MOBILITYFROMEUTRACOMMAND IS SET TO EUTRA:
    2> PERFORM THE PROCEDURES AS SPECIFIED IN 5.4.2.5;
1> ELSE:
    2> IF T304 EXPIRES (MOBILITY FROM E-UTRA FAILURE); OR
    2> IF THE UE DOES NOT SUCCEED IN ESTABLISHING THE CONNECTION TO THE TARGET RADIO ACCESS TECHNOLOGY; OR
    2> IF THE UE IS UNABLE TO COMPLY WITH (PART OF) THE CONFIGURATION INCLUDED IN THE MOBILITYFROMEUTRACOMMAND MESSAGE; OR
    2> IF THERE IS A PROTOCOL ERROR IN THE INTER RAT INFORMATION INCLUDED IN THE MOBILITYFROMEUTRACOMMAND MESSAGE, CAUSING THE UE TO FAIL THE PROCEDURE ACCORDING TO THE SPECIFICATIONS APPLICABLE FOR THE TARGET RAT:
        3> STOP T304, IF RUNNING;
        3> IF THE CS-FALLBACKINDICATOR IN THE MOBILITYFROMEUTRACOMMAND MESSAGE WAS SET TO TRUE OR E-CSFB WAS PRESENT:
            4> INDICATE TO UPPER LAYERS THAT THE CS FALLBACK PROCEDURE HAS FAILED;
        3> REVERT BACK TO THE CONFIGURATION USED IN THE SOURCE PCELL, EXCLUDING THE CONFIGURATION CONFIGURED BY THE PHYSICALCONFIGDEDICATED, MAC-MAINCONFIG AND SPS-CONFIG;
   3> INITIATE THE CONNECTION RE-ESTABLISHMENT PROCEDURE AS SPECIFIED IN 5.3.7;
NOTE: FOR ENHANCED CS FALLBACK TO CDMA2000 1XRTT, THE ABOVE UE BEHAVIOR APPLIES ONLY WHEN THE UE IS ATTEMPTING THE ENHANCED 1XRTT CS FALLBACK AND CONNECTION TO THE TARGET RADIO ACCESS TECHNOLOGY FAILS OR IF THE UE IS ATTEMPTING ENHANCED 1XRTT CS FALLBACK ALONG WITH CONCURRENT MOBILITY TO CDMA2000 HRPD AND CONNECTION TO BOTH THE TARGET RADIO ACCESS TECHNOLOGIES FAILS.

5.4.2.4 Reconfiguration Failure
THE UE SHALL:
1> IF THE UE IS UNABLE TO COMPLY WITH (PART OF) THE CONFIGURATION INCLUDED IN THE RRCCONNECTIONRECONFIGURATION MESSAGE:
  2> IF THE SOURCE RAT THAT SENT THE RRCCONNECTIONRECONFIGURATION MESSAGE IS E-UTRA:
   3> PERFORM THE ACTIONS DEFINED IN INTRA-RAT HANDOVER FAILURE PROCEDURE AS SPECIFIED IN 5.3.5.6;
  2> ELSE:
   3> PERFORM THE ACTIONS DEFINED FOR THIS FAILURE CASE AS DEFINED IN THE SPECIFICATIONS APPLICABLE FOR THE OTHER RAT;
NOTE 1: THE UE MAY APPLY ABOVE FAILURE HANDLING ALSO IN CASE THE RRCCONNECTIONRECONFIGURATION MESSAGE CAUSES A PROTOCOL ERROR FOR WHICH THE GENERIC ERROR HANDLING AS DEFINED IN 5.7 SPECIFIES THAT THE UE SHALL IGNORE THE MESSAGE.
NOTE 2: IF THE UE IS UNABLE TO COMPLY WITH PART OF THE CONFIGURATION, IT DOES NOT APPLY ANY PART OF THE CONFIGURATION, I.E. THERE IS NO PARTIAL SUCCESS/FAILURE.

5.4.2.5 T304 Expiry (Handover to E-UTRA Failure)
THE UE SHALL:
1> UPON T304 EXPIRY (HANDOVER TO E-UTRA FAILURE):
  2> IF THE SOURCE RAT THAT SENT THE RRCCONNECTIONRECONFIGURATION MESSAGE IS E-UTRA:
   3> PERFORM THE ACTIONS DEFINED IN INTRA-RAT HANDOVER FAILURE PROCEDURE AS SPECIFIED IN 5.3.5.6;
  2> ELSE:
   3> RESET MAC;
   3> PERFORM THE ACTIONS DEFINED FOR THIS FAILURE CASE AS DEFINED IN THE SPECIFICATIONS APPLICABLE FOR THE OTHER RAT;

Example 2 for Intra-LTE Handover with CN Change Failure
5.4.3.5 Mobility from E-UTRA Failure
THE UE SHALL:
1> IF THE TARGETRAT-TYPE IN THE RECEIVED MOBILITYFROMEUTRACOMMAND IS SET TO EUTRA:
  2> PERFORM THE ACTIONS DEFINED IN INTRA-RAT HANDOVER FAILURE PROCEDURE AS SPECIFIED IN 5.3.5.6;
1> ELSE:
  2> IF T304 EXPIRES (MOBILITY FROM E-UTRA FAILURE); OR
  2> IF THE UE DOES NOT SUCCEED IN ESTABLISHING THE CONNECTION TO THE TARGET RADIO ACCESS TECHNOLOGY; OR
  2> IF THE UE IS UNABLE TO COMPLY WITH (PART OF) THE CONFIGURATION INCLUDED IN THE MOBILITYFROMEUTRACOMMAND MESSAGE; OR
  2> IF THERE IS A PROTOCOL ERROR IN THE INTER RAT INFORMATION INCLUDED IN THE MOBILITYFROMEUTRACOMMAND MESSAGE, CAUSING THE UE TO FAIL THE PROCEDURE ACCORDING TO THE SPECIFICATIONS APPLICABLE FOR THE TARGET RAT:
   3> STOP T304, IF RUNNING;
   3> IF THE CS-FALLBACKINDICATOR IN THE MOBILITYFROMEUTRACOMMAND MESSAGE WAS SET TO TRUE OR E-CSFB WAS PRESENT:
    4> INDICATE TO UPPER LAYERS THAT THE CS FALLBACK PROCEDURE HAS FAILED;
   3> REVERT BACK TO THE CONFIGURATION USED IN THE SOURCE PCELL, EXCLUDING THE CONFIGURATION CONFIGURED BY THE PHYSICALCONFIGDEDICATED, MAC-MAINCONFIG AND SPS-CONFIG;
   3> INITIATE THE CONNECTION RE-ESTABLISHMENT PROCEDURE AS SPECIFIED IN 5.3.7;
NOTE: FOR ENHANCED CS FALLBACK TO CDMA2000 1XRTT, THE ABOVE UE BEHAVIOR APPLIES ONLY WHEN THE UE IS ATTEMPTING THE ENHANCED 1XRTT CS FALLBACK AND CONNECTION TO THE TARGET RADIO ACCESS TECHNOLOGY FAILS OR IF THE UE IS ATTEMPTING ENHANCED 1XRTT CS FALLBACK ALONG WITH CONCURRENT MOBILITY TO CDMA2000 HRPD AND CONNECTION TO BOTH THE TARGET RADIO ACCESS TECHNOLOGIES FAILS.

5.4.2.4 Reconfiguration Failure
THE UE SHALL:
1> IF THE UE IS UNABLE TO COMPLY WITH (PART OF) THE CONFIGURATION INCLUDED IN THE RRCCONNECTIONRECONFIGURATION MESSAGE:
  2> IF THE SOURCE RAT THAT SENT THE RRCCONNECTIONRECONFIGURATION MESSAGE IS E-UTRA:
   3> PERFORM THE PROCEDURES SPECIFIED IN SECTION 5.4.3.5;
  2> ELSE:
   3> PERFORM THE ACTIONS DEFINED FOR THIS FAILURE CASE AS DEFINED IN THE SPECIFICATIONS APPLICABLE FOR THE OTHER RAT;
NOTE 1: THE UE MAY APPLY ABOVE FAILURE HANDLING ALSO IN CASE THE RRCCONNECTIONRECONFIGURATION MESSAGE CAUSES A PROTOCOL ERROR FOR WHICH THE GENERIC

ERROR HANDLING AS DEFINED IN 5.7 SPECIFIES THAT THE UE SHALL IGNORE THE MESSAGE.

NOTE 2: IF THE UE IS UNABLE TO COMPLY WITH PART OF THE CONFIGURATION, IT DOES NOT APPLY ANY PART OF THE CONFIGURATION, I.E. THERE IS NO PARTIAL SUCCESS/FAILURE.

5.4.2.5 T304 Expiry (Handover to E-UTRA Failure)

THE UE SHALL:
1> UPON T304 EXPIRY (HANDOVER TO E-UTRA FAILURE):
 2> IF THE SOURCE RAT THAT SENT THE RRC-CONNECTIONRECONFIGURATION MESSAGE IS E-UTRA:
  3> PERFORM THE PROCEDURES SPECIFIED IN SECTION 5.4.3.5;
 2> ELSE:
  3> RESET MAC;
  3> PERFORM THE ACTIONS DEFINED FOR THIS FAILURE CASE AS DEFINED IN THE SPECIFICATIONS APPLICABLE FOR THE OTHER RAT;

Example 3 for Intra-LTE Handover with CN Change Failure 5.4.3.5 Mobility from E-UTRA Failure THE UE SHALL:
1> IF THE TARGETRAT-TYPE IN THE RECEIVED MOBILITYFROMEUTRACOMMAND IS SET TO EUTRA:
 2> PERFORM THE ACTIONS DEFINED IN INTRA-RAT HANDOVER FAILURE PROCEDURE AS SPECIFIED IN 5.3.5.6;
1> ELSE:
 2> IF T304 EXPIRES (MOBILITY FROM E-UTRA FAILURE); OR
 2> IF THE UE DOES NOT SUCCEED IN ESTABLISHING THE CONNECTION TO THE TARGET RADIO ACCESS TECHNOLOGY; OR
 2> IF THE UE IS UNABLE TO COMPLY WITH (PART OF) THE CONFIGURATION INCLUDED IN THE MOBILITYFROMEUTRACOMMAND MESSAGE; OR
 2> IF THERE IS A PROTOCOL ERROR IN THE INTER RAT INFORMATION INCLUDED IN THE MOBILITYFROMEUTRACOMMAND MESSAGE, CAUSING THE UE TO FAIL THE PROCEDURE ACCORDING TO THE SPECIFICATIONS APPLICABLE FOR THE TARGET RAT:
  3> STOP T304, IF RUNNING;
  3> IF THE CS-FALLBACKINDICATOR IN THE MOBILITYFROMEUTRACOMMAND MESSAGE WAS SET TO TRUE OR E-CSFB WAS PRESENT:
   4> INDICATE TO UPPER LAYERS THAT THE CS FALLBACK PROCEDURE HAS FAILED;
  3> REVERT BACK TO THE CONFIGURATION USED IN THE SOURCE PCELL, EXCLUDING THE CONFIGURATION CONFIGURED BY THE PHYSICALCONFIGDEDICATED, MAC-MAINCONFIG AND SPS-CONFIG;
  3> INITIATE THE CONNECTION RE-ESTABLISHMENT PROCEDURE AS SPECIFIED IN 5.3.7;

NOTE: For enhanced CS fallback to CDMA2000 1xRTT, the above UE behavior applies only when the UE is attempting the enhanced 1xRTT CS fallback and connection to the target radio access technology fails or if the UE is attempting enhanced 1xRTT CS fallback along with concurrent mobility to CDMA2000 HRPD and connection to both the target radio access technologies fails.

5.4.2.4 Reconfiguration Failure

THE UE SHALL:
1> IF THE UE IS UNABLE TO COMPLY WITH (PART OF) THE CONFIGURATION INCLUDED IN THE RRCCONNECTIONRECONFIGURATION MESSAGE:
 2> IF THE SOURCE RAT THAT SENT THE RRC-CONNECTIONRECONFIGURATION MESSAGE IS E-UTRA:
  3> PERFORM THE ACTIONS DEFINED IN INTRA-RAT HANDOVER FAILURE PROCEDURE AS SPECIFIED IN 5.3.5.6;
 2> ELSE:
  3> PERFORM THE ACTIONS DEFINED FOR THIS FAILURE CASE AS DEFINED IN THE SPECIFICATIONS APPLICABLE FOR THE OTHER RAT;

NOTE 1: THE UE MAY APPLY ABOVE FAILURE HANDLING ALSO IN CASE THE RRCCONNECTIONRECONFIGURATION MESSAGE CAUSES A PROTOCOL ERROR FOR WHICH THE GENERIC ERROR HANDLING AS DEFINED IN 5.7 SPECIFIES THAT THE UE SHALL IGNORE THE MESSAGE.

NOTE 2: IF THE UE IS UNABLE TO COMPLY WITH PART OF THE CONFIGURATION, IT DOES NOT APPLY ANY PART OF THE CONFIGURATION, I.E. THERE IS NO PARTIAL SUCCESS/FAILURE.

5.4.2.5 T304 Expiry (Handover to E-UTRA Failure)

Figure 5:
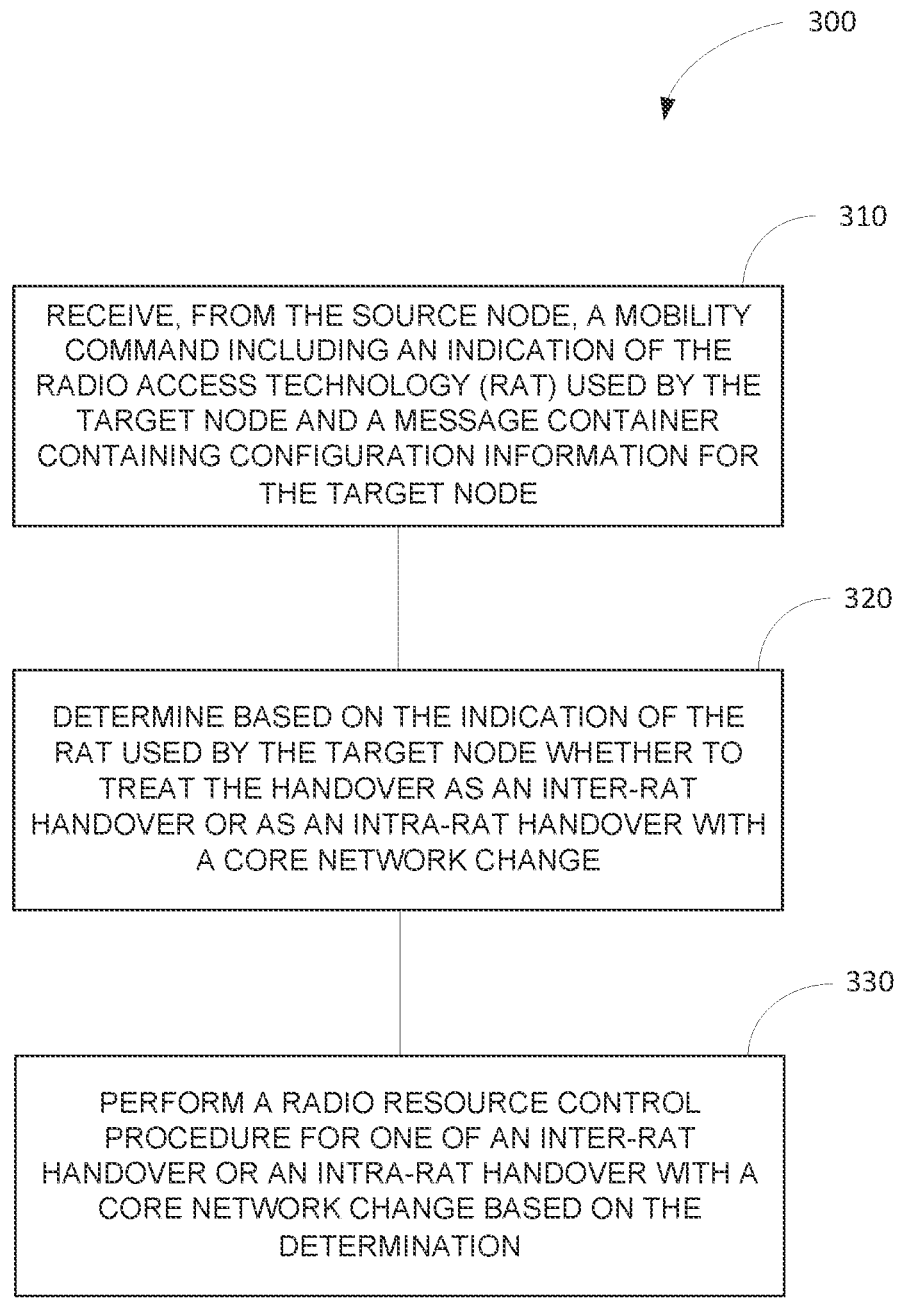
FIG. 5 illustrates an exemplary method implemented by a UE to support intra-RAT handover with core network change.

THE UE SHALL:
1> UPON T304 EXPIRY (HANDOVER TO E-UTRA FAILURE):
 2> IF THE SOURCE RAT THAT SENT THE RRC-CONNECTIONRECONFIGURATION MESSAGE IS E-UTRA:
  3> PERFORM THE ACTIONS DEFINED IN INTRA-RAT HANDOVER FAILURE PROCEDURE AS SPECIFIED IN 5.3.5.6;
 2> ELSE:
  3> RESET MAC;
  3> PERFORM THE ACTIONS DEFINED FOR THIS FAILURE CASE AS DEFINED IN THE SPECIFICATIONS APPLICABLE FOR THE OTHER RAT;

FIG. 5 illustrates an exemplary method 300 implemented by a UE 100 to support intra-RAT handovers with a core network change as herein described. More particularly, the method 300 is implemented by a UE 100 in a wireless communication network 10 when performing a handover from a source node (e.g., eNB 20) connected to a first core network (e.g., EPC 50) to a target node (e.g., ng-eNB 30) connected to a second core network (e.g., 5GC 60). In one example, the UE 100 receives, from the source node, a mobility command including an indication of the radio access technology (RAT) used by the target node and a message container containing configuration information for the target node (block 310). The UE 100 determines based on the indication of the RAT used by the target node whether to treat the handover as an inter-RAT handover or as an intra-RAT handover with a core network change (block 320). Based on the determination, the UE 100 performs a RRC procedure for one of an inter-RAT handover or an inter-RAT handover (block 330).

In some embodiments of the method 300, determining whether to treat the handover as an inter-RAT handover or as an intra-RAT handover with a core network change comprises determining to treat the handover as an intra-RAT handover with a core network change when the indication indicates a first type of RAT.

In some embodiments of the method 300, the first RAT type is Evolved Universal Mobile Telecommunications System (UMTS) Terrestrial Radio Access (E-UTRA).

In some embodiments of the method 300, performing a radio resource control procedure based on the determination comprises, upon successfully completing the handover, remaining in a Radio Resource Control Connected (RRC_CONNECTED) state and ending Mobility from E-UTRA procedures.

In some embodiments of the method 300, performing a radio resource control procedure based on the determination comprises, upon occurrence of a mobility failure, performing an intra-RAT handover failure procedure.

In some embodiments, the mobility failure comprises a reconfiguration failure, handover to E-UTRA failure, or a timer expiration.

In some embodiments of the method 300, the mobility command comprises an E-UTRA MobilityFromEUTRACommand message.

In some embodiments of the method 300, the message container contains an E-UTRA RRCConnectionReconfiguration message from the target node.

In some embodiments of the method 300, the first core network comprises an Evolved Packet Core (EPC) network and the second core network comprise a 5th Generation Core (5GC) network.

In some embodiments of the method 300, the first core network comprises a 5th Generation Core (5GC) network and the second core network comprise an Evolved Packet Core (EPC) network.

FIGS. 6-9 illustrate exemplary RRC procedures for the case of an intra-RAT handover with a core network change.

Figure 6:
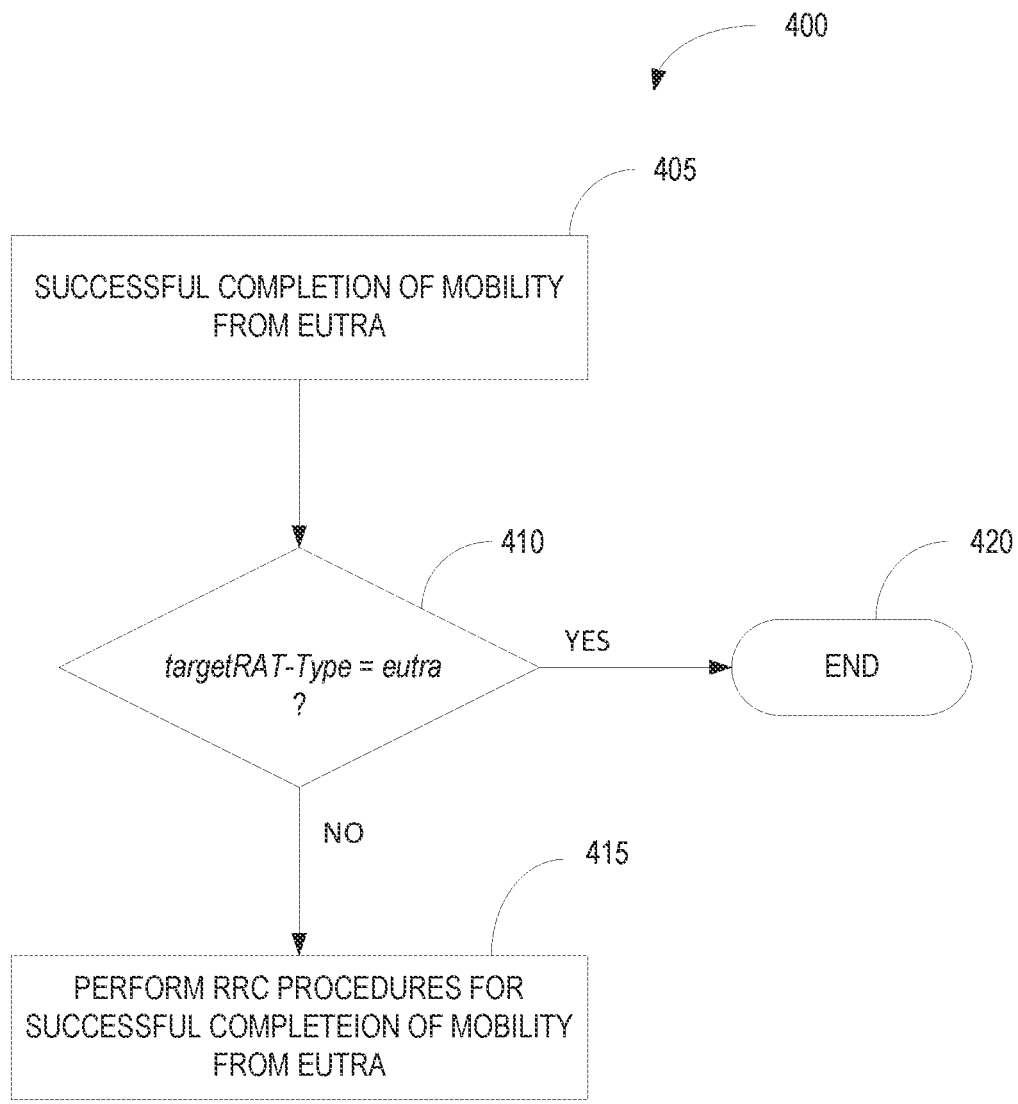
FIG. 6 illustrates a procedure implemented by a UE following a successful intra-RAT handover with a core network change.

FIG. 6 illustrates an exemplary RRC procedure 400 for a successful handover from the source node to a target node. The UE 100 successfully completes the mobility from E-UTRA procedure (block 405). After the successful completion of the mobility from E-UTRA procedure, the UE 100 checks whether the targetRAT-Type indication is set to eutra (block 410). If the targetRAT-Type indication is set to eutra, the procedure 400 ends (block 420). If the targetRAT-Type indication is not set to eutra, the UE 100 performs the RRC procedures for successful competition of mobility from E-UTRA (block 415).

Figure 7:
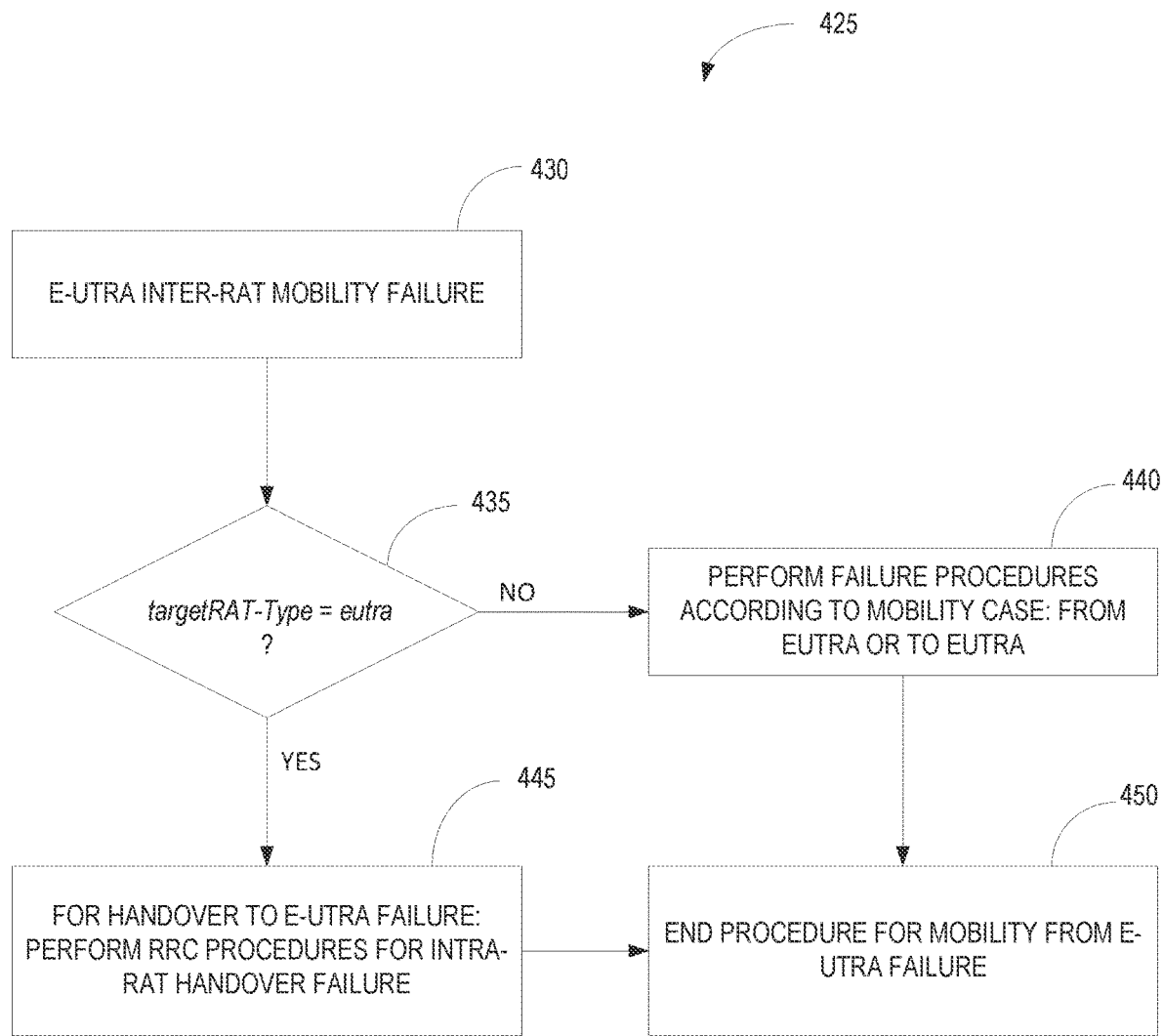
FIG. 7 illustrates a first exemplary procedure implemented by a UE following a failed intra-RAT handover with a core network change.

FIG. 7 illustrates an exemplary RRC procedure 425 in case of a mobility failure according to a first embodiment. The E-UTRA inter-RAT mobility failure procedure is triggered by the mobility failure (block 430). The UE 100 checks whether the targetRAT-Type indication is set to eutra (block 435). If the targetRAT-Type indication is not set to eutra, the UE 100 performs RRC procedures for the mobility case, i.e., mobility from E-UTRA failure or mobility to E-UTRA failure. E-UTRA (block 440) and the procedure ends (block 450). If the targetRAT-Type indication is set to eutra, for handover to E-UTRA failure, the UE 100 performs the RRC procedures for intra-RAT handover failure (block 445) and the procedure ends (block 450).

Figure 8:
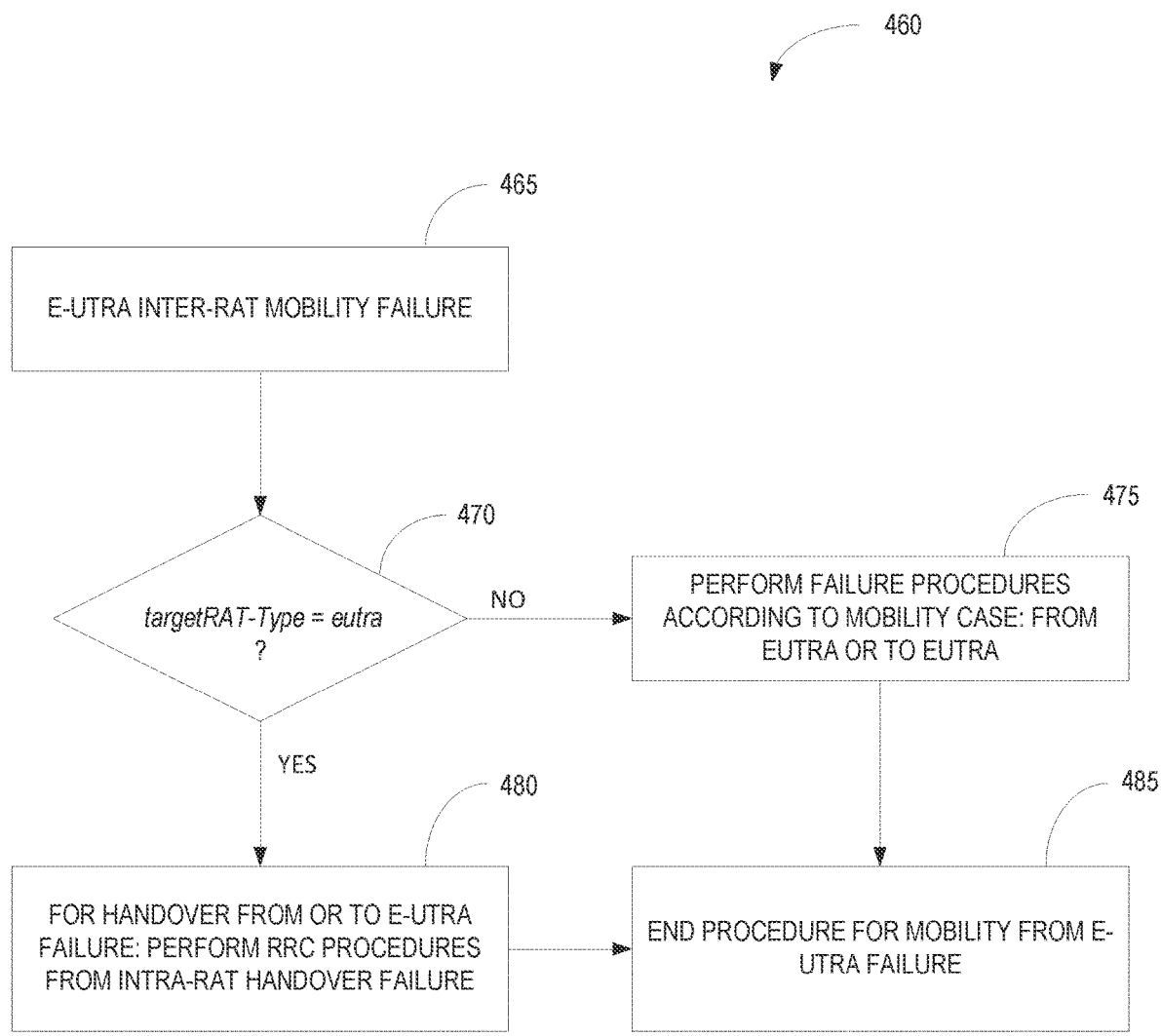
FIG. 8 illustrates a second exemplary procedure implemented by a UE following a failed intra-RAT handover with a core network change.

FIG. 8 illustrates an exemplary RRC procedure 460 in case of a mobility failure according to a second embodiment. The E-UTRA inter-RAT mobility failure procedure is triggered by the mobility failure (block 465). The UE 100 checks whether the targetRAT-Type indication is set to eutra (block 470). If the targetRAT-Type indication is not set to eutra, the UE 100 performs RRC procedures for the mobility case, i.e., mobility from E-UTRA failure or mobility to E-UTRA failure. E-UTRA (block 475) and the procedure ends (block 485). If the targetRAT-Type indication is set to eutra, for handover from E-UTRA failure, the UE 100 performs the RRC procedures for intra-RAT handover failure (block 480) and the procedure ends (block 485).

Figure 9:
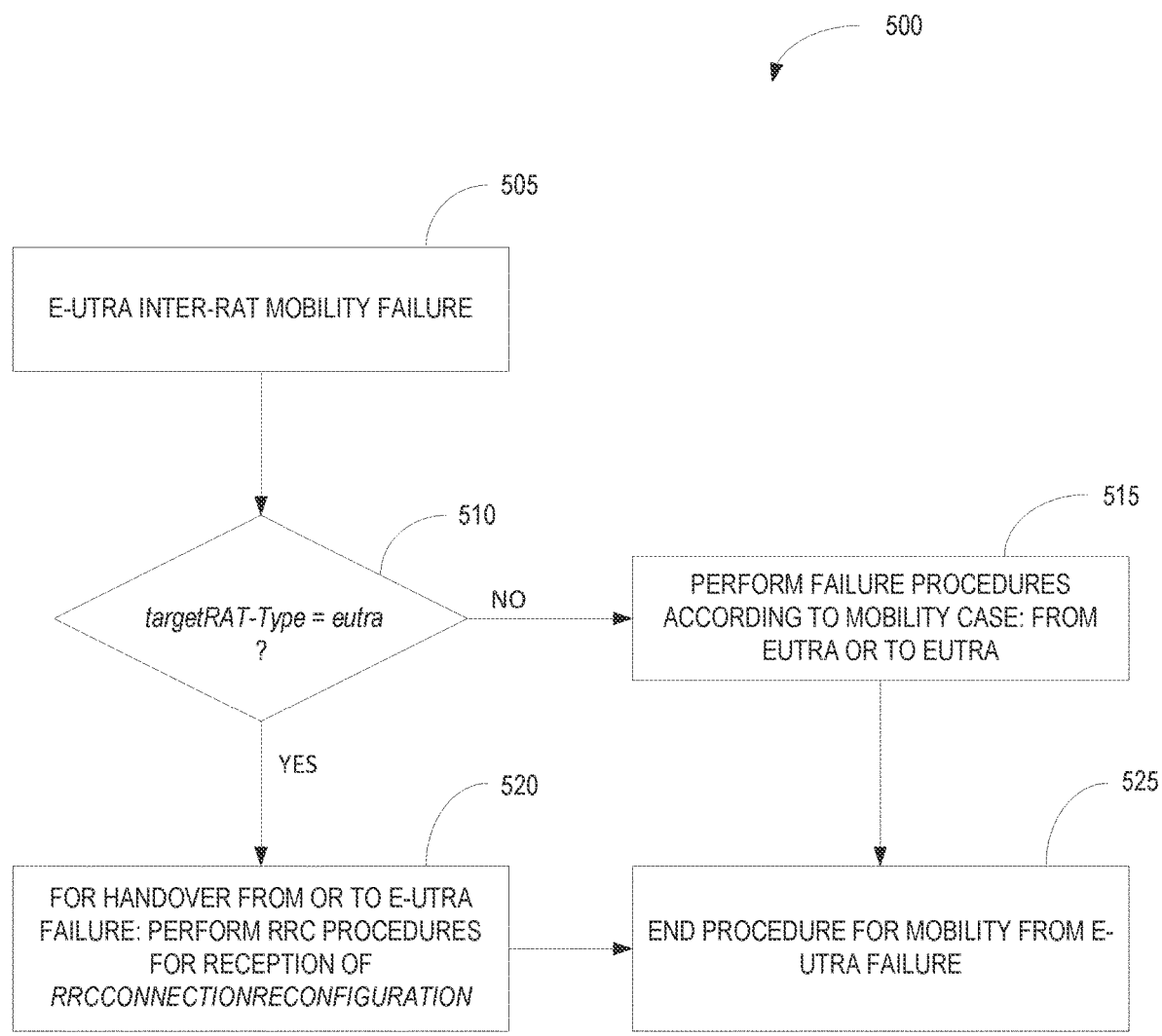
FIG. 9 illustrates a third exemplary procedure implemented by a UE following a failed intra-RAT handover with a core network change.

FIG. 9 illustrates an exemplary RRC procedure 500 in case of a mobility failure according to a third embodiment. The E-UTRA inter-RAT mobility failure procedure is triggered by the mobility failure (block 505). The UE 100 checks whether the targetRAT-Type indication is set to eutra (block 510). If the targetRAT-Type indication is not set to eutra, the UE 100 performs RRC procedures for the mobility case, i.e., mobility from E-UTRA failure or mobility to E-UTRA failure (block 515) and the procedure ends (block 525). If the targetRAT-Type indication is set to eutra, for handover to or from E-UTRA failure, the UE 100 performs the RRC procedures for reception of the RRCConnectionReconfiguration (block 520) and the procedure ends (block 525).

Figure 10:
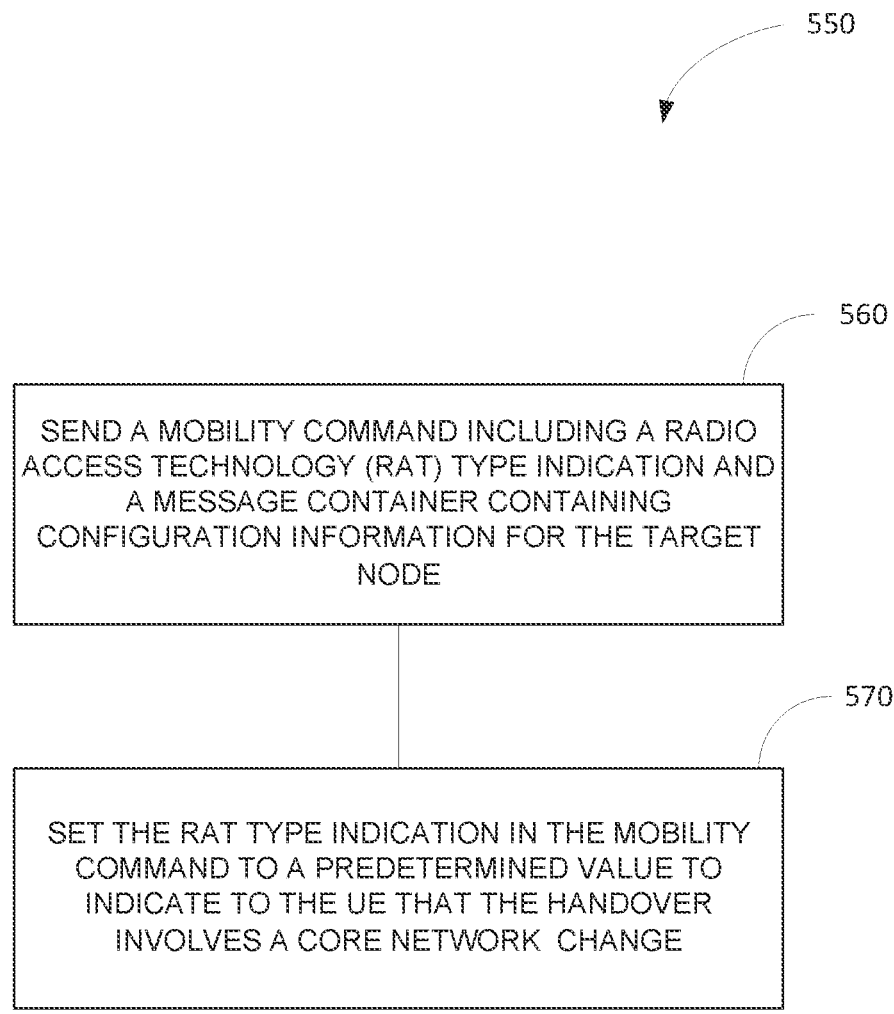
FIG. 10 illustrates an exemplary method implemented by a base station.

FIG. 10 illustrates an exemplary method 550 performed by a source node 20, 30 (e.g., eNB 20 or ng-eNB 30). The source node 20, 30 sends a mobility command including a radio access technology (RAT) type indication and a message container containing configuration information for the target node (e.g., eNB 20 or ng-eNB 30) (block 560). The source node 20, 30 sets the RAT type indication in the mobility command to a predetermined value to indicate to the UE that the handover involves a core network change (block 570).

In some embodiments of the method 550, the source node and target node comprise E-UTRA base stations.

In some embodiments of the method 550, the mobility command comprises an E-UTRA MobilityFromEUTRACommand message.

In some embodiments of the method 550, the message container contains an E-UTRA RRCConnectionReconfiguration message from the target node.

In some embodiments of the method 550, the first core network comprises an Evolved Packet Core (EPC) network and the second core network comprises a 5th Generation Core (5GC) network.

In some embodiments of the method 550, the first core network comprises a 5th Generation Core (5GC) network and the second core network comprise an Evolved Packet Core (EPC) network.

Figure 11:
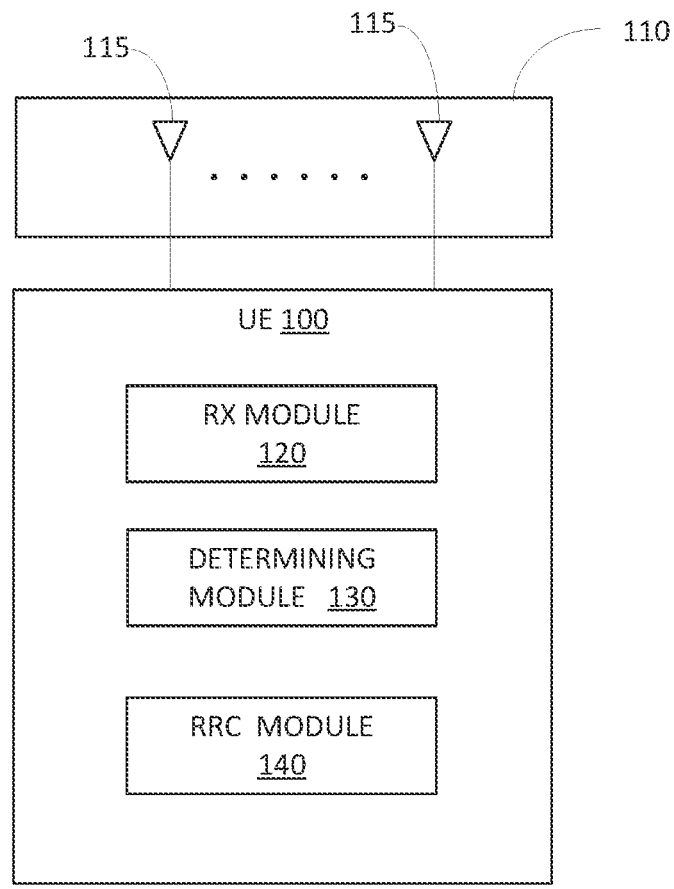
FIG. 11 illustrates an exemplary UE according to an embodiment.

In some embodiments of the method 550, setting the RAT type indication in the mobility command to a predetermined value comprises setting the RAT type indication in the mobility command to eutra, FIG. 11 illustrates a UE 100 in accordance with one or more embodiments. The UE 100 comprises an antenna array 110 having multiple antennas 115, a receiving (RX) module 120, a determining module 130 and a RRC module 140. The various modules 120, 130, and 140 can be implemented by hardware and/or by software code that is executed by one or more processors or processing circuits. The receiving module 120 is configured to receive, from the source node (e.g., eNB 20 or ng-eNB 30), a mobility command including an indication of the radio access technology (RAT) used by the target node (e.g., eNB 20 or ng-eNB 30) and a message container containing configuration information for the target node. The determining module 130 is configured to determine, based on the indication of the RAT used by the target node, whether to treat the handover as an inter-RAT handover or as an intra-RAT handover with a core network change The RRC module 140 is configured to perform a RRC procedure for one of an inter-RAT handover or an inter-RAT handover.

Figure 12:
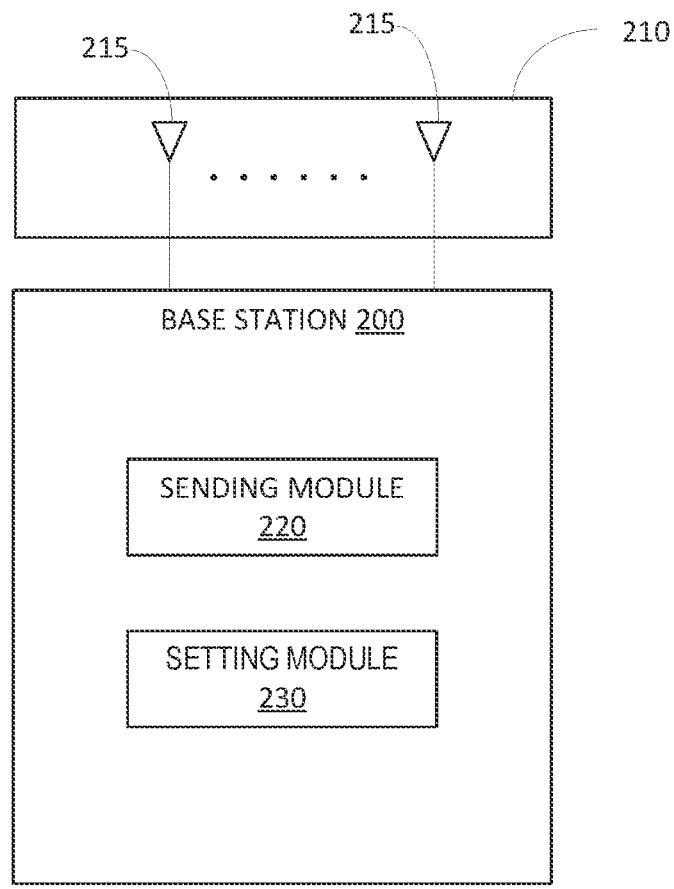
FIG. 12 illustrates an exemplary base station according to an embodiment.

FIG. 12 illustrates an E-UTRA base station 200 in accordance with one or more embodiments. The E-UTRA base station 200 comprises an antenna array 210 having multiple antennas 215, a sending module 220 and a setting module 230. The modules 220 and 230 can be implemented by hardware and/or by software code that is executed by one or more processors or processing circuits. The sending module 220 is configured to send a mobility command including a radio access technology (RAT) type indication and a message container containing configuration information for a target base station. The setting module 230 is configured to set the RAT type indication in the mobility command to a predetermined value to indicate to the UE that the handover involves a core network 50, 60 change.

Figure 13:
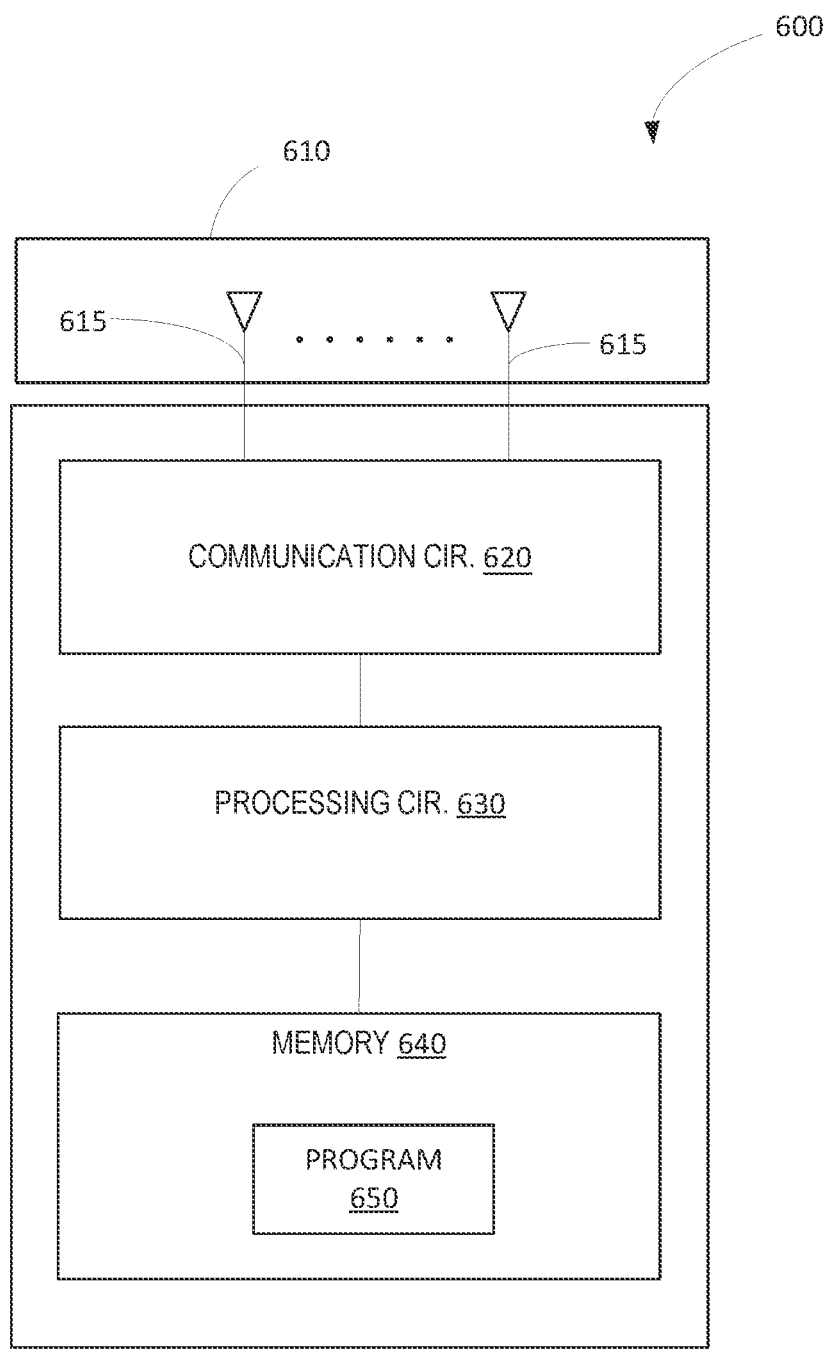
FIG. 13 illustrates exemplary UE according to another embodiment.

FIG. 13 illustrates a UE 600 according to another embodiment that is configured to implement the methods as herein described. The UE 600 comprises an antenna array 610 with multiple antenna elements 615, a communication circuit 620, a processing circuit 630, and memory 640.

The communication circuit 620 is coupled to the antenna elements 615 and comprises the radio frequency (RF) circuitry needed for transmitting and receiving signals over a wireless communication channel. The processing circuit 630 controls the overall operation of the UE 600 and processes the signals transmitted to or received by the UE 600. The processing circuit 630 is configured to perform the method 300 shown in FIG. 5, as well as the procedures 400, 425, 460 and 500 shown in FIGS. 6-9 respectively. The processing circuit 630 may comprise one or more microprocessors, hardware, firmware, or a combination thereof.

Memory 640 comprises both volatile and non-volatile memory for storing computer program code and data needed by the processing circuit 630 for operation. Memory 640 may comprise any tangible, non-transitory computer-readable storage medium for storing data including electronic, magnetic, optical, electromagnetic, or semiconductor data storage. Memory 640 stores a computer program 650 comprising executable instructions that configure the processing circuit 630 to implement methods 300 according to FIG. 5 as described herein. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 650 for configuring the processing circuit 630 as herein described may be stored in a removable memory, such as a portable compact disc, portable digital video disc, or other removable media. The computer program 650 may also be embodied in a carrier such as an electronic signal, optical signal, radio signal, or computer readable storage medium.

Figure 14:
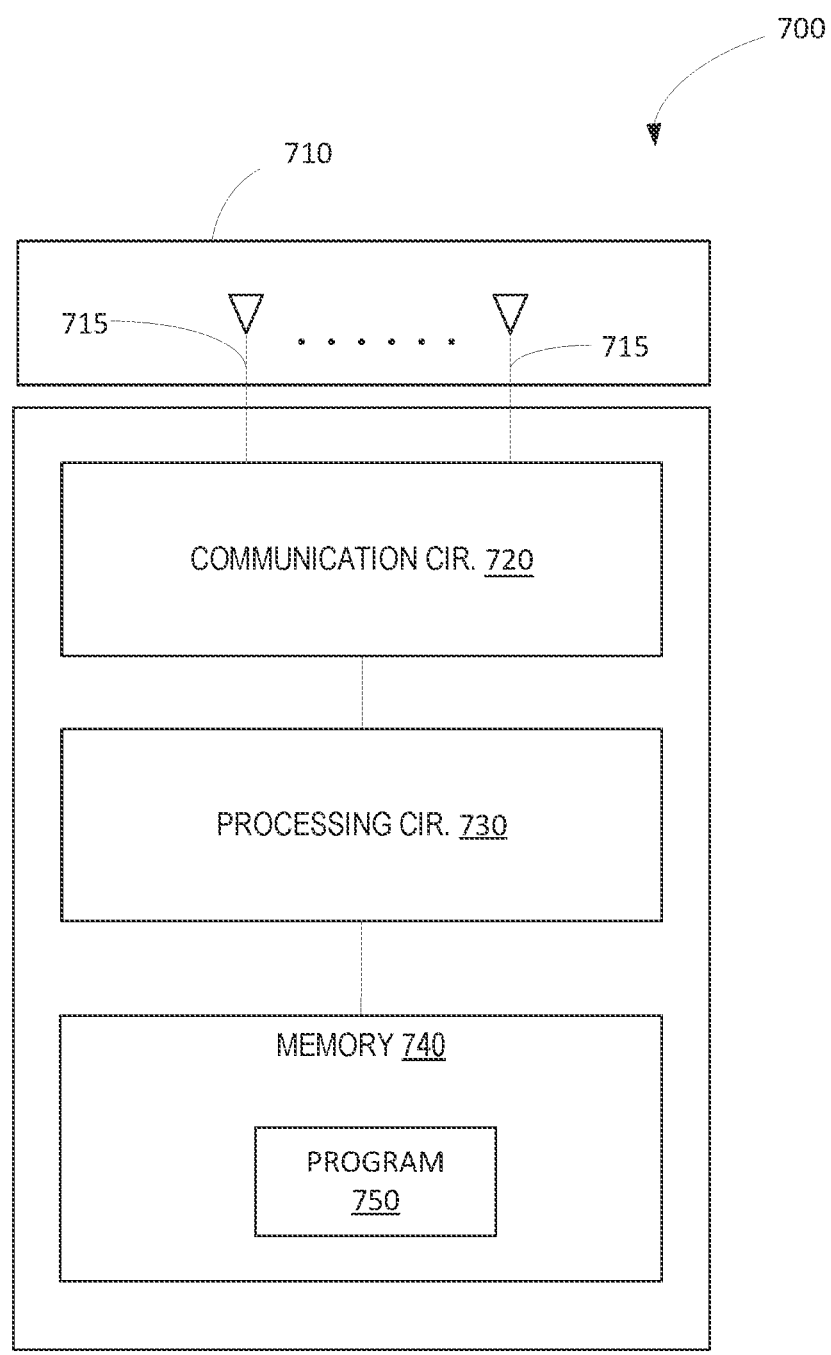
FIG. 14 illustrates an exemplary base station according to another embodiment.

FIG. 14 illustrates a base station 700 according to another embodiment that is configured to implement the methods as herein described. The base station 700 comprises an antenna array 710 with multiple antenna elements 715, a communication circuit 720, a processing circuit 730, and memory 740.

The communication circuit 720 is coupled to the antenna elements 715 and comprises the radio frequency (RF) circuitry needed for transmitting and receiving signals over a wireless communication channel. The processing circuit 730 controls the overall operation of the base station 700 and processes the signals transmitted to or received by the UE 600. The processing circuit 730 is configured to perform the method 550 shown in FIG. 10. The processing circuit 730 may comprise one or more microprocessors, hardware, firmware, or a combination thereof.

Memory 740 comprises both volatile and non-volatile memory for storing computer program code and data needed by the processing circuit 730 for operation. Memory 740 may comprise any tangible, non-transitory computer-readable storage medium for storing data including electronic, magnetic, optical, electromagnetic, or semiconductor data storage. Memory 740 stores a computer program 750 comprising executable instructions that configure the processing circuit 730 to implement methods 550 according to FIG. 10 as described herein. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 750 for configuring the processing circuit 730 as herein described may be stored in a removable memory, such as a portable compact disc, portable digital video disc, or other removable media. The computer program 750 may also be embodied in a carrier such as an electronic signal, optical signal, radio signal, or computer readable storage medium.

The methods and apparatus as herein described enable intra-RAT handover with CN change with proper functioning of success and failure cases, which will prevent ambiguity in the actions performed in RRC. The legacy procedure for intra-RAT handover with CN change may not work as the whole E-UTRA configuration would be released after a successful handover, while multiple failure procedures would be triggered. Without the changes proposed in this disclosure, a UE will be forced to go via the IDLE mode when performing an intra-LTE inter-system handover, which could cause a major service disruption (e.g., if the UE already has active delay sensitive services/bearers).

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessors or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Additional Embodiments

Figure 15:
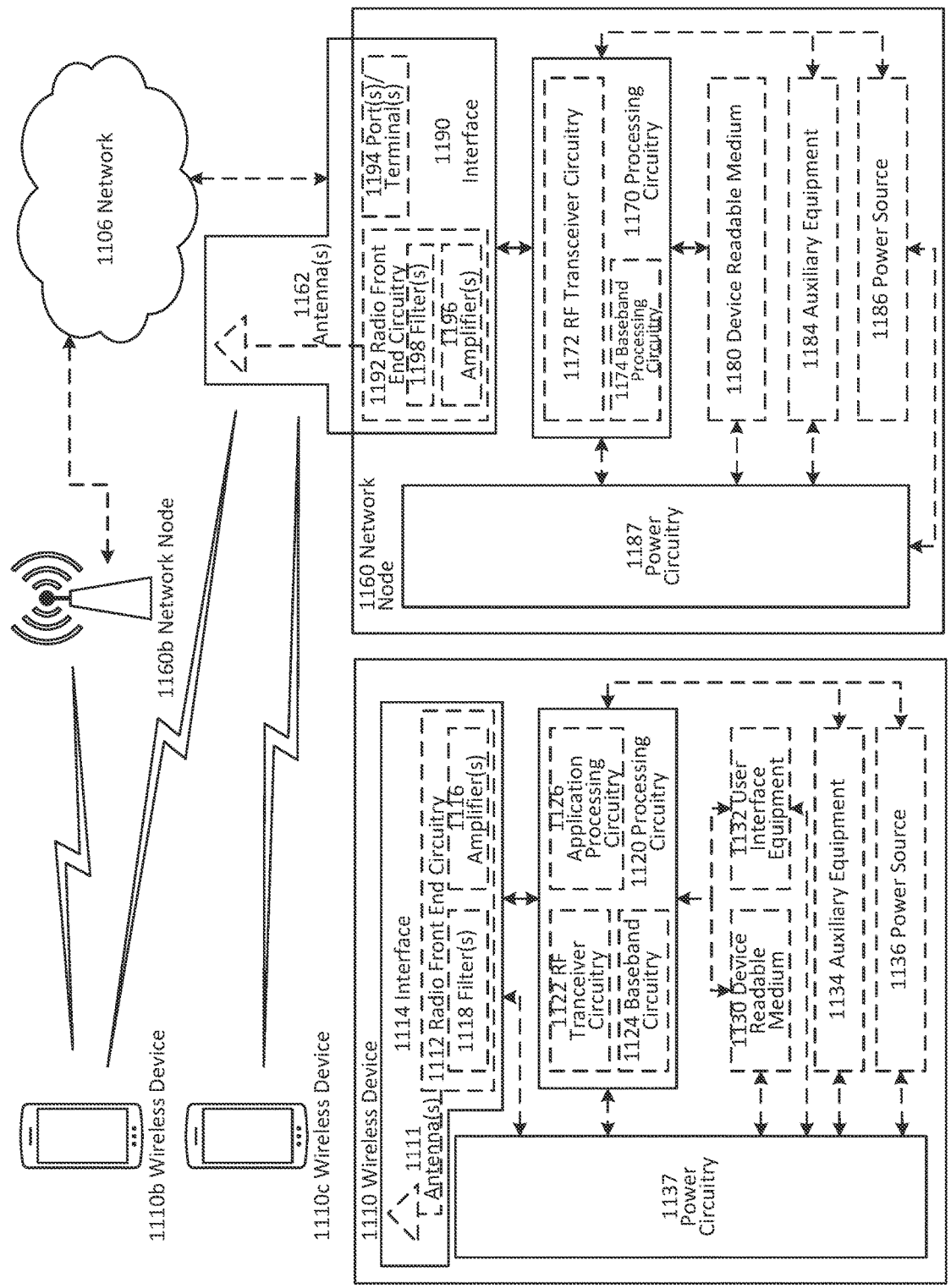
FIG. 15 illustrates an exemplary wireless network according to an embodiment.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units.

In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1192 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 15 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1112 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity sensor or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 16:
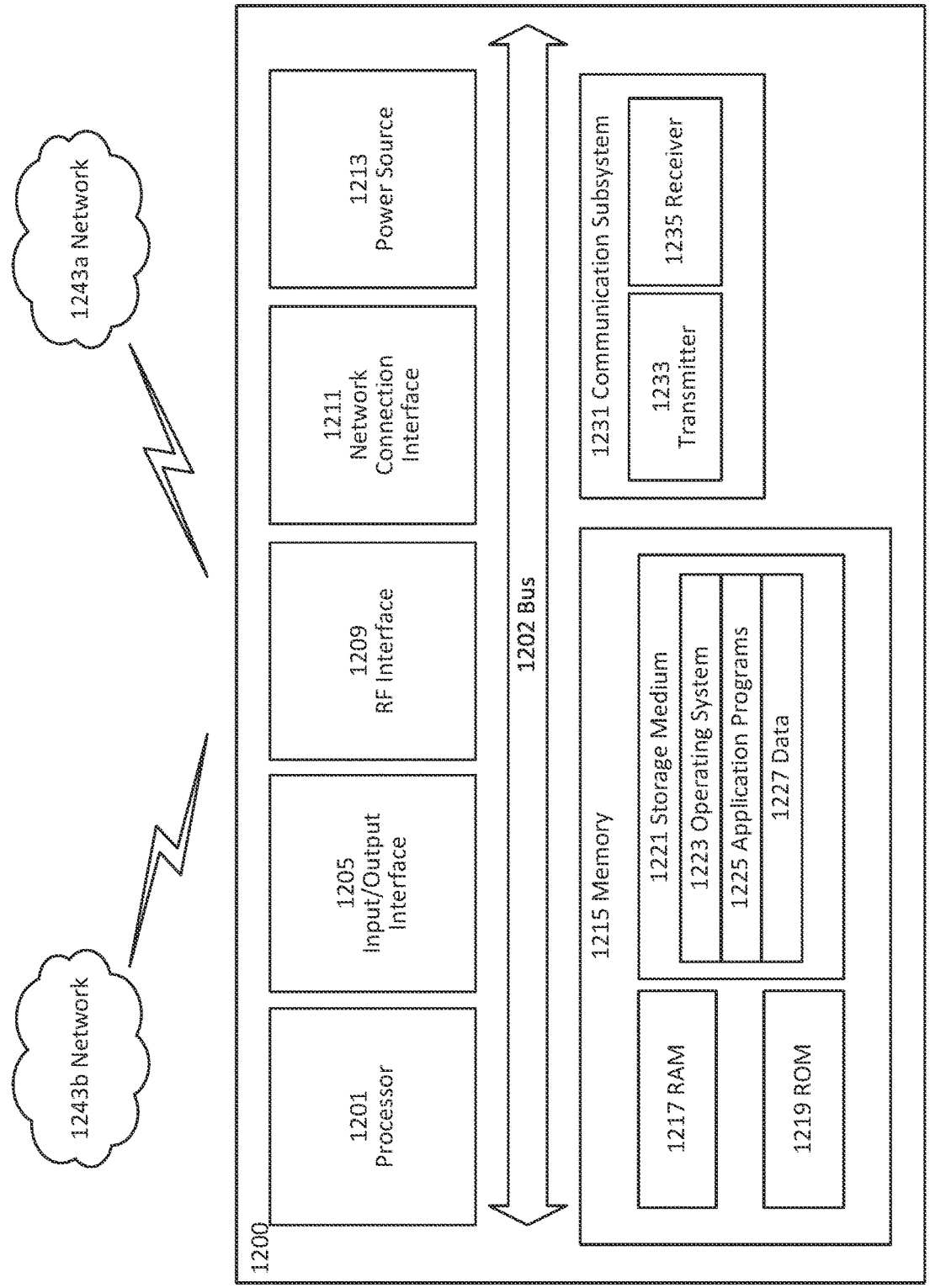
FIG. 16 illustrates an exemplary UE according to an embodiment.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 16, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeably. Accordingly, although FIG. 16 is a UE, the components discussed herein are equally applicable to a WD, and vice-versa.

In FIG. 16, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, transmitter 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity module (SIM/RUIM), other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 16, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 17:
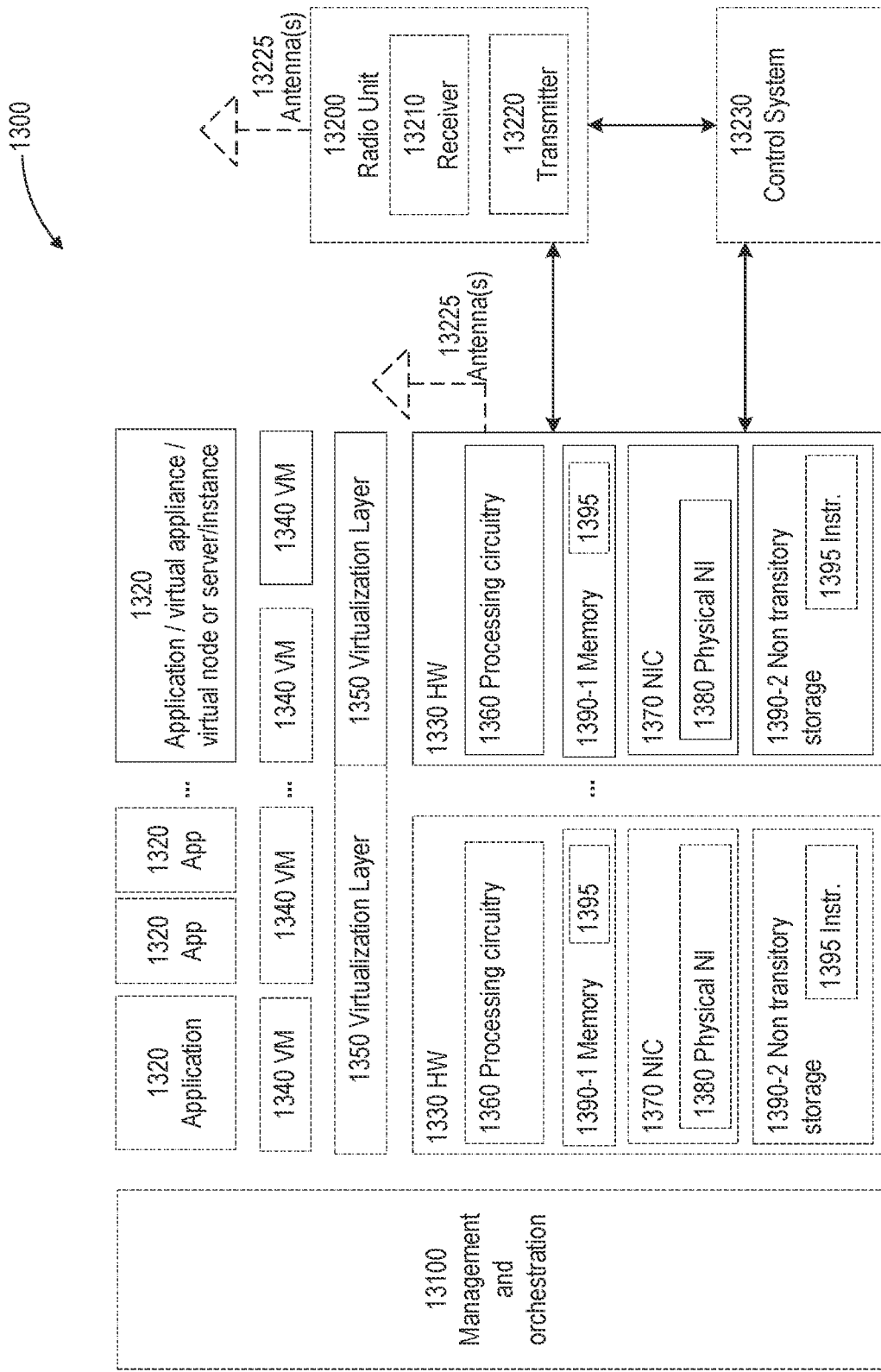
FIG. 17 illustrates an exemplary virtualization environment according to an embodiment.

FIG. 17 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390-1. Memory 1390-1 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 16, hardware 1330 may be a standalone network node with generic or specific components. Hardware 1330 may comprise antenna 13225 and may implement some functions via virtualization. Alternatively, hardware 1330 may be part of a larger cluster of hardware (e.g., such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 16.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signaling can be effected with the use of control system 13230 which may alternatively be used for communication between the hardware nodes 1330 and radio units 13200.

Figure 18:
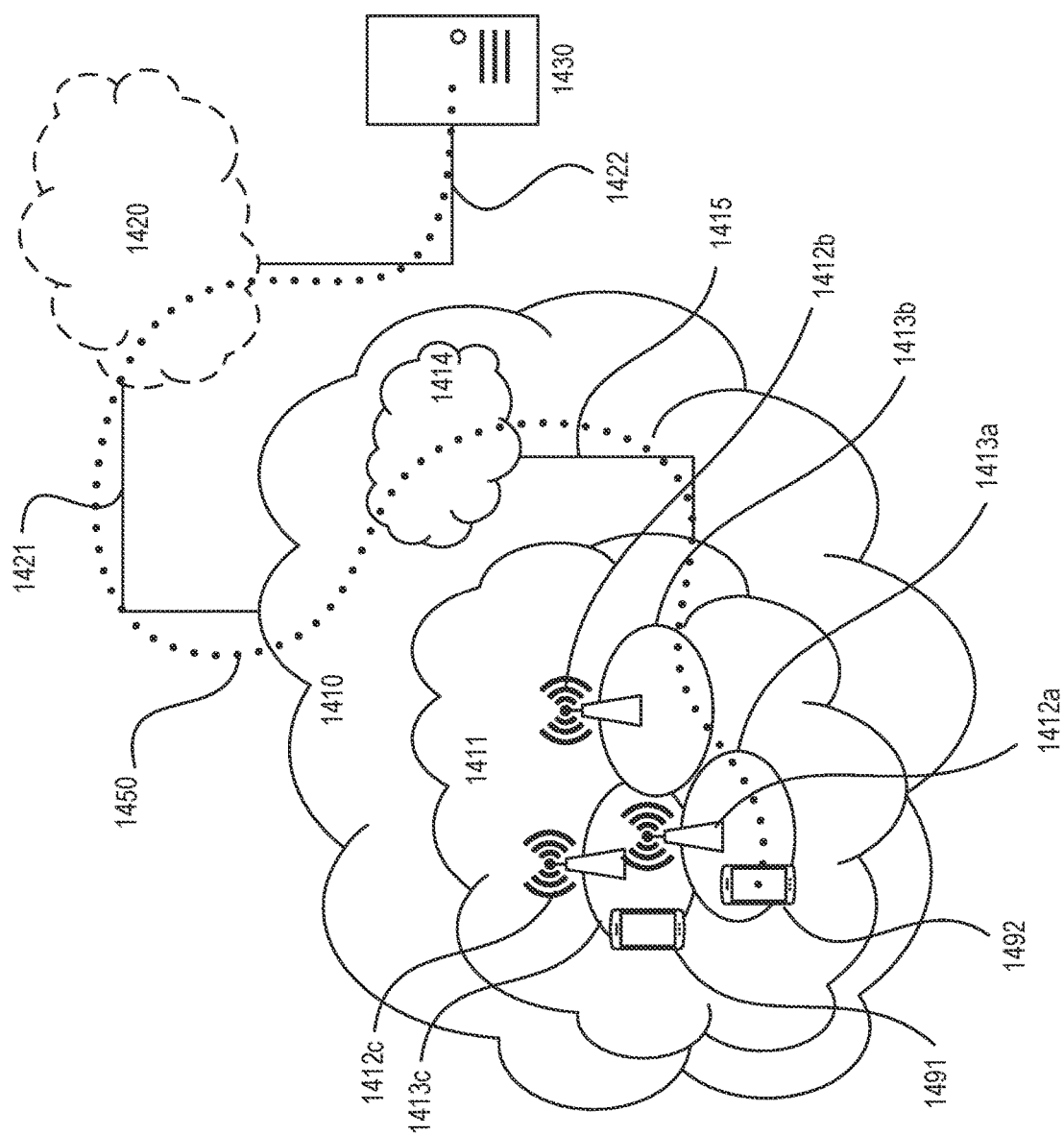
FIG. 18 illustrates an exemplary telecommunication network connected via an intermediate network to a host computer according to an embodiment.

FIG. 18 illustrates a telecommunication network connected via an intermediate network to a host computer in accordance with some embodiments. In particular, with reference to FIG. 18, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, and a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 18 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 19:
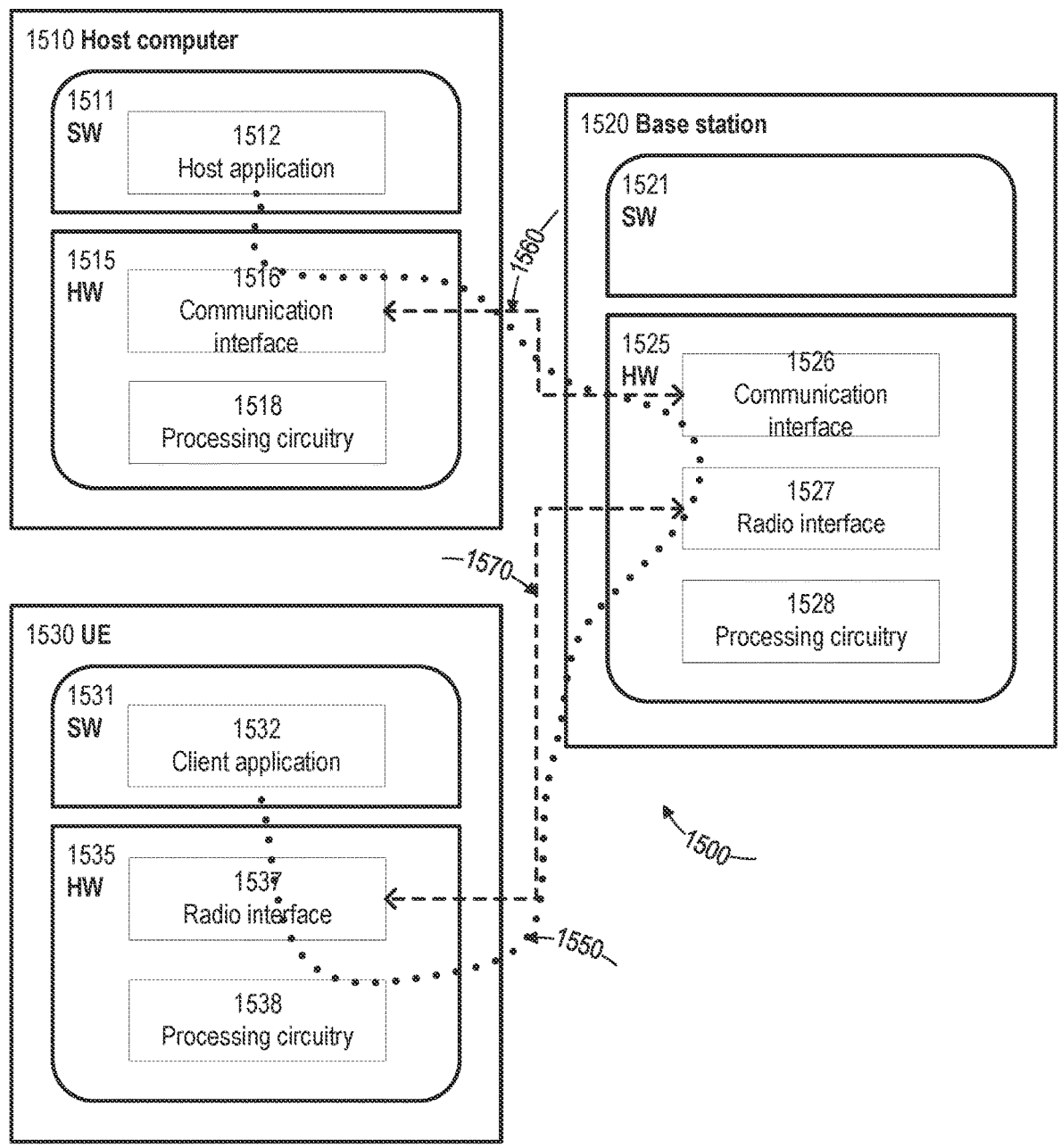
FIG. 19 illustrates an exemplary host computer communicating via a base station with a user equipment over a partially wireless connection according to an embodiment.

Example implementations, in accordance with an embodiment, of the UE, base station and host computer discussed in the preceding paragraphs will now be described with reference to FIG. 19. FIG. 19 illustrates host computer communicating via a base station with a user equipment over a partially wireless connection in accordance with some embodiments in communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 19) served by base station 1520. Communication interface 1526 may be configured to facilitate connection 1560 to host computer 1510. Connection 1560 may be direct or it may pass through a core network (not shown in FIG. 19) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 19 may be similar or identical to host computer 1430, one of base stations 1412a, 1412b, 1412c and one of UEs 1491, 1492 of FIG. 18, respectively. This is to say, the inner workings of these entities may be as shown in FIG. 19 and independently, the surrounding network topology may be that of FIG. 18.

In FIG. 19, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the continuity of service when performing an intra-RAT handover with a core network change and thereby provide benefits such as continuity of service and improved customer experience.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc. The reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510 measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 20:
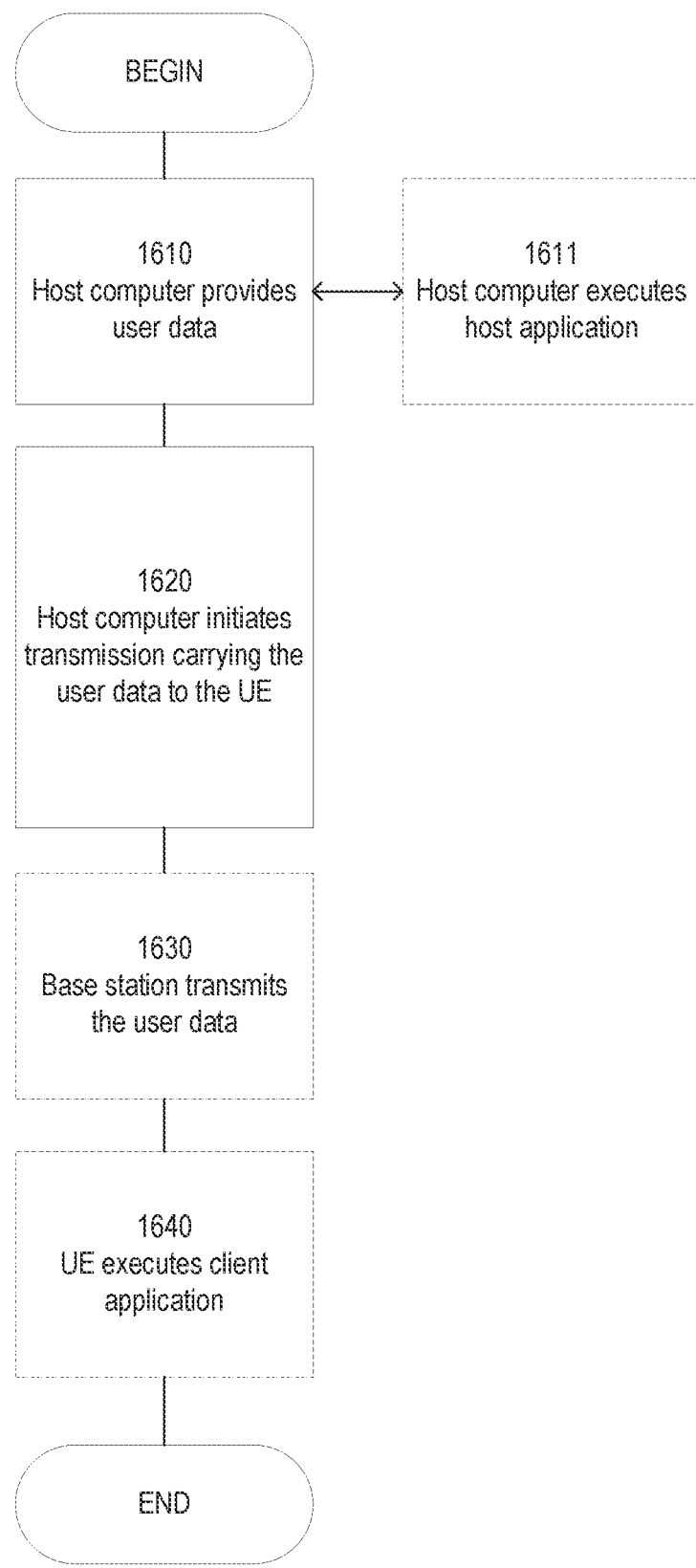
FIGS. 20-23 illustrate exemplary methods implemented in a communication system, according to an embodiment.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 21:
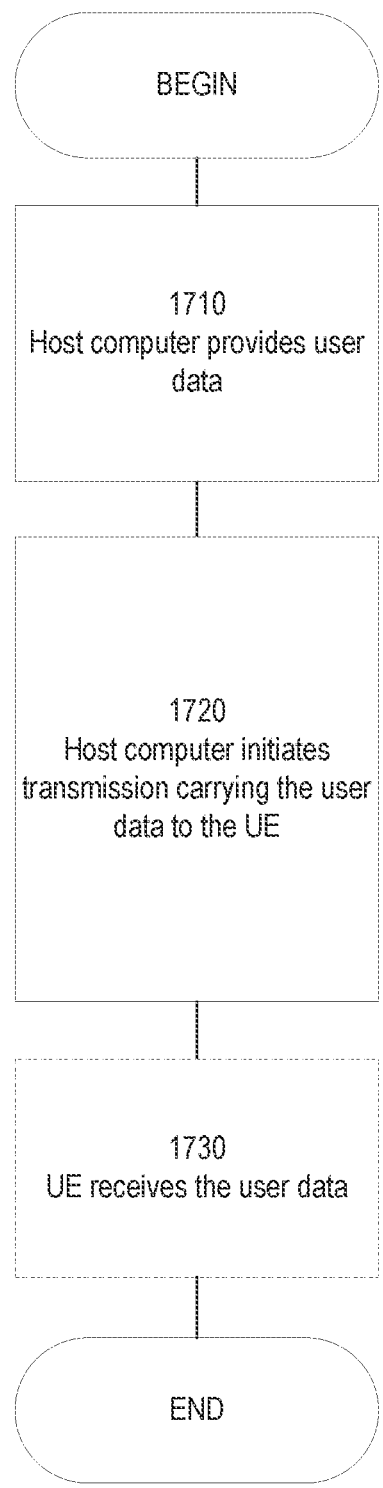

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 22:
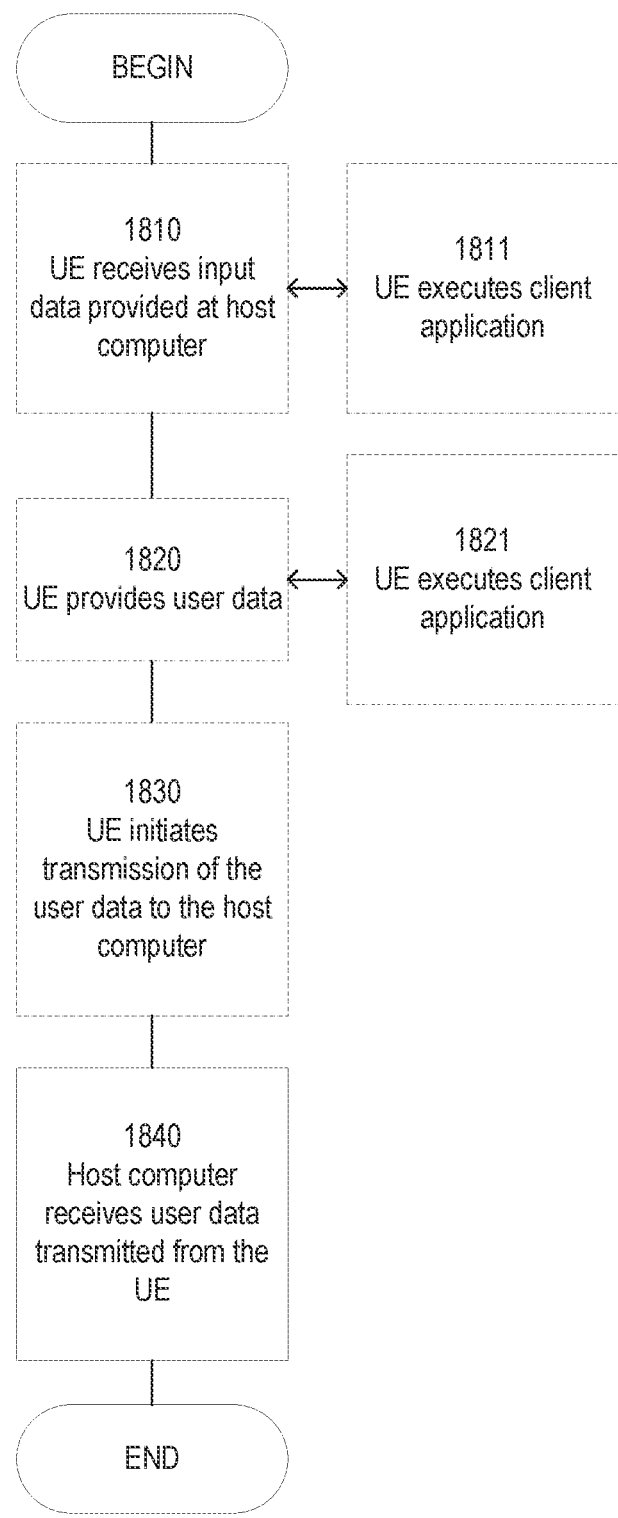

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in step 1830 (which may be optional), transmission of the user data to the host computer. In step 1840 of the method, the host computer receives the user data transmitted from the UE, in accordance with the teachings of the embodiments described throughout this disclosure.

Figure 23:
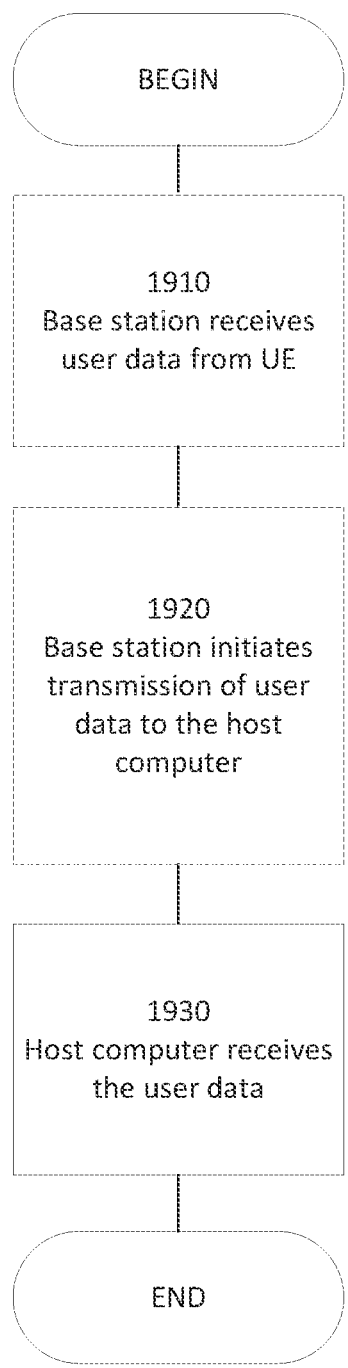

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessors or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according to one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method implemented by a user equipment in a wireless communication network of performing a handover from a source node connected to a first core network to a target node connected to a second core network, said method comprising:
   receiving, from the source node, a mobility command including an indication of a radio access technology, RAT, used by the target node and a message container containing configuration information for the target node;

determining based on the indication of the RAT used by the target node whether to treat the handover as an inter-RAT handover or as an intra-RAT handover with a core network change, wherein the determining comprises determining to treat the handover as an intra-RAT handover with a core network change when the indication indicates a first type of RAT; and performing a radio resource control, RRC, procedure for an intra-RAT handover with a core network change based on the determination to treat the handover as an intra-RAT handover with a core network change, wherein performing the RRC procedure for an intra-RAT handover with a core network change comprises inter-RAT handover signaling procedure and, upon successfully completing the handover, remaining in a Radio Resource Control Connected, RRC_CONNECTED, state and ending the RRC procedure.

2. The method of claim 1, wherein the first type of RAT is Evolved Universal Mobile Telecommunications System, UMTS, Terrestrial Radio Access, E-UTRA.

3. The method of claim 1, wherein performing a radio resource control procedure based on the determination comprises:

upon occurrence of a mobility failure, performing an intra-RAT handover failure procedure.

4. The method of claim 3, wherein the mobility failure comprises a reconfiguration failure, a handover to EUTRA failure, or a timer expiration.

5. The method of claim 1, wherein the mobility command comprises an E-UTRA MobilityFromEUTRACommand.

6. The method of claim 5, wherein the message container contains an E-UTRA RRCConnectionReconfiguration message from the target node.

7. The method of claim 1, wherein the first core network comprises an Evolved Packet Core, EPC, network and the second core network comprise a 5th Generation Core, 5GC, network.

8. The method of claim 1, wherein the first core network comprises a 5th Generation Core, 5GC, network and the second core network comprises an Evolved Packet Core, EPC, network.

9. A non-transitory computer-readable storage medium containing a computer program comprising executable instructions that, when executed by a processing circuit in a user equipment in a wireless communication network causes the user equipment to perform the method of claim 1.

10. A user equipment in a wireless communication network, said user equipment being configured to:

receive, from a source node, a mobility command including an indication of a radio access technology, RAT, used by a target node and a message container containing configuration information for the target node;

determine, based on the indication of the RAT used by the target node, whether to treat a handover of the user equipment as an inter-RAT handover or as an intra-RAT handover with a core network change, wherein when the indication indicates a first type of RAT, treat the handover as an intra-RAT handover with a core network change; and perform a radio resource control, RRC, procedure for an intra-RAT handover with a core network change based on the determination to treat the handover as an intra-RAT handover with a core network change, wherein performing the RRC procedure for an intra-RAT handover with a core network change comprises inter-RAT handover signaling procedure and, upon successfully completing the handover, remaining in a Radio Resource Control Connected, RRC_CONNECTED, state and ending the RRC procedure.

11. The user equipment of claim 10, wherein the first type of RAT is Evolved Universal Mobile Telecommunications System, UMTS, Terrestrial Radio Access, EUTRA.

12. The user equipment of claim 11, wherein the processing circuit is further configured to, upon occurrence of a mobility failure, perform an intra-RAT handover failure procedure.

13. The user equipment of claim 12, wherein the mobility failure comprises a reconfiguration failure or a handover to E-UTRA failure.

14. The user equipment of claim 10, wherein the mobility command comprises an E-UTRA MobilityFromEUTRACommand.

15. The user equipment of claim 14, wherein the message container contains an E-UTRA RRCConnectionReconfiguration message from the target node.

16. The user equipment of claim 10, wherein the core network comprises an Evolved Packet Core, EPC, network or a 5th Generation Core, 5GC, network.

* * * * *

UNITED STATES PATENT AND TRADEMARK OFFICE
CERTIFICATE OF CORRECTION

| | |
|---|---|
| PATENT NO. | : 11,638,191 B2 |
| APPLICATION NO. | : 17/687513 |
| DATED | : April 25, 2023 |
| INVENTOR(S) | : Araujo et al. |

It is certified that error appears in the above-identified patent and that said Letters Patent is hereby corrected as shown below:

On the Title Page

On Page 2, in Item (56), under "OTHER PUBLICATIONS", in Column 2, Lines 20-21, delete "Hangzou, P.R. China," and insert -- Hangzhou, P.R. of China, --, therefor.

In the Drawings

In Fig. 6, Sheet 6 of 23, for Tag "415", Line 2, delete "COMPLETEION" and insert -- COMPLETION --, therefor.

In Fig. 15, Sheet 15 of 23, for Tag "1122", Line 1, delete "Tranceiver" and insert -- Transceiver --, therefor.

In Fig. 15, Sheet 15 of 23, for Tag "1124", Line 1, delete "Baseband" and insert -- Baseband Processing --, therefor.

In Fig. 16, Sheet 16 of 23, for Tag "1201", Line 1, delete "Processor" and insert -- Processing Circuitry --, therefor.

In the Specification

In Column 1, Line 9, delete "2019," and insert -- 2019, now Pat. No. 11,272,415, --, therefor.

In Column 8, Line 6, delete "AILURE):" and insert -- FAILURE): --, therefor.

In Column 9, Line 14, delete "'Reception" and insert -- Reception --, therefor.

In Column 9, Line 67, delete "1xRTT" and insert -- 1XRTT --, therefor.

In Column 16, Line 52, delete "eutra," and insert -- eutra. --, therefor.

Signed and Sealed this
Tenth Day of October, 2023

*Katherine Kelly Vidal*

Katherine Kelly Vidal
*Director of the United States Patent and Trademark Office*

CERTIFICATE OF CORRECTION (continued)
U.S. Pat. No. 11,638,191 B2

In Column 21, Line 27, delete "(SOC)." and insert -- (SoC). --, therefor.

In Column 25, Line 29, delete "SOC." and insert -- SoC. --, therefor.

In Column 34, Line 16, delete "which it" and insert -- which --, therefor.